United States Patent
Mammou et al.

(10) Patent No.: US 12,256,098 B1
(45) Date of Patent: Mar. 18, 2025

(54) REAL TIME SIMPLIFICATION OF MESHES

(71) Applicant: Apple Inc., Cupertino, CA (US)

(72) Inventors: Khaled Mammou, Vancouver (CA); Afshin Taghavi Nasrabadi, Sunnyvale, CA (US); Maneli Noorkami, Sunnyvale, CA (US); Fabrice A. Robinet, Sunnyvale, CA (US)

(73) Assignee: Apple, Inc., Cupertino, CA (US)

( * ) Notice: Subject to any disclaimer, the term of this patent is extended or adjusted under 35 U.S.C. 154(b) by 166 days.

(21) Appl. No.: 17/691,691

(22) Filed: Mar. 10, 2022

Related U.S. Application Data

(60) Provisional application No. 63/170,319, filed on Apr. 2, 2021.

(51) Int. Cl.
*H04N 19/597* (2014.01)
*G06T 17/20* (2006.01)
*H04N 19/176* (2014.01)
*H04N 19/182* (2014.01)

(52) U.S. Cl.
CPC ......... *H04N 19/597* (2014.11); *G06T 17/205* (2013.01); *H04N 19/176* (2014.11); *H04N 19/182* (2014.11)

(58) Field of Classification Search
CPC .. H04N 19/597; H04N 19/176; H04N 19/182; G06T 17/205
See application file for complete search history.

(56) References Cited

U.S. PATENT DOCUMENTS

| | | | |
|---|---|---|---|
| 8,289,318 B1 | 10/2012 | Hadap et al. | |
| 9,445,121 B2 * | 9/2016 | Tourapis | .............. H04N 19/176 |
| 10,462,485 B2 * | 10/2019 | Mammou | ............ H04N 19/119 |
| 11,783,508 B2 | 10/2023 | Mammou et al. | |
| 11,861,788 B1 | 1/2024 | Taghavi Nasrabadi et al. | |
| 11,922,665 B2 | 3/2024 | Mammou et al. | |

(Continued)

FOREIGN PATENT DOCUMENTS

| | | |
|---|---|---|
| CN | 106651942 B | 9/2019 |
| CN | 111629193 B | 11/2020 |

(Continued)

OTHER PUBLICATIONS

U.S. Appl. No. 17/804,801, filed May 31, 2022, Maneli Noorkami, et al.

(Continued)

*Primary Examiner* — Tracy Y. Li
*Assistant Examiner* — Shanika M Brumfield
(74) *Attorney, Agent, or Firm* — Alexander A. Knapp; Kowert, Hood, Munyon, Rankin & Goetzel, P.C.

(57) ABSTRACT

A decoding computing device receives a bit stream for compressed 3D volumetric content. The bit stream includes video encoded image frames comprising packed attribute patch images and depth maps for the 3D volumetric content. Instead of generating a mesh having a vertex for each depth value signaled in the depth map, the decoder performs a real-time mesh simplification process to reduce a resolution of the mesh, such that the mesh resolution is reduced without exceeding an error threshold, which may be dynamically determined. Additionally, the decoder may perform a re-meshing of particular regions of the mesh for the 3D volumetric content to avoid cracks or gaps.

20 Claims, 18 Drawing Sheets

(56) References Cited

U.S. PATENT DOCUMENTS

| | | |
|---|---|---|
| 11,948,338 B1 | 4/2024 | Mammou |
| 11,986,960 B2 | 5/2024 | Kupcsik et al. |
| 2012/0269458 A1* | 10/2012 | Graziosi .............. H04N 19/597 |
| | | 382/299 |
| 2014/0044347 A1* | 2/2014 | Sato ....................... H04N 19/11 |
| | | 382/154 |
| 2018/0300583 A1* | 10/2018 | Peng ...................... G06V 20/30 |
| 2019/0313110 A1* | 10/2019 | Mammou ................ G06T 7/248 |
| 2020/0014940 A1* | 1/2020 | Dawar .................... G06T 9/001 |
| 2020/0021845 A1* | 1/2020 | Lin ...................... H04N 19/105 |
| 2020/0213593 A1* | 7/2020 | Chiang ................ H04N 19/513 |
| 2023/0298218 A1 | 9/2023 | Schwarz |

FOREIGN PATENT DOCUMENTS

| | | |
|---|---|---|
| CN | 111882668 B | 6/2022 |
| CN | 107451540 B | 9/2023 |

OTHER PUBLICATIONS

U.S. Appl. No. 17/804,799, filed May 31, 2022, Afshin Taghavi Nasrabadi, et al.

* cited by examiner

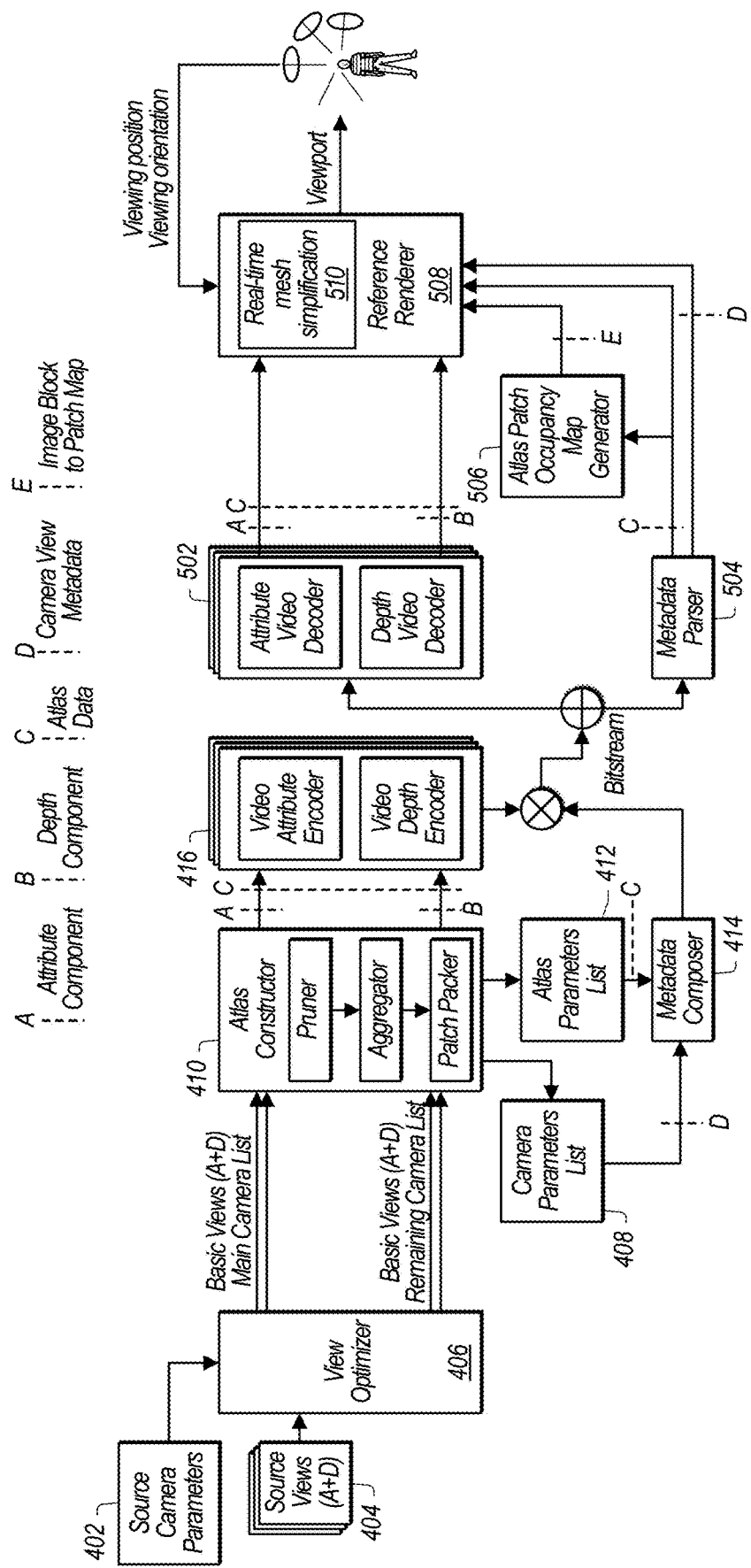

REAL TIME SIMPLIFICATION OF MESHES

BACKGROUND

Related Application

This application claims benefit of priority to U.S. Provisional Application Ser. No. 63/170,319, entitled "Real Time Simplification of Meshes at a Decoding Device," filed Apr. 2, 2021, and which is incorporated herein by reference in its entirety.

Technical Field

This disclosure relates generally to compression and decompression of three-dimensional (3D) volumetric content, more particularly to coding of volumetric content using simplified meshes.

DESCRIPTION OF THE RELATED ART

Three-dimensional (3D) volumetric content may be generated using images captured by multiple cameras positioned at different camera angles and/or locations relative to an object or scene to be captured. The 3D volumetric content includes attribute information for the object or scene, such as color information (e.g. RGB values), texture information, intensity attributes, reflectivity attributes, or various other attributes. In some circumstances, additional attributes may be assigned, such as a time-stamp when the 3D volumetric content was captured. The 3D volumetric content also includes geometry information for the object or scene, such as depth values for surfaces of the object or depth values for items in the scene. Such 3D volumetric content may comprise a set of views each having associated spatial information (e.g. depth) and associated attributes. In some circumstances, 3D volumetric content may be generated, for example in software, as opposed to being captured by one or more cameras/sensors. In either case, such 3D volumetric content may include large amounts of data and may be costly and time-consuming to render at a decoding device.

SUMMARY OF EMBODIMENTS

In some embodiments, attribute information, such as colors, textures, etc. for three-dimensional (3D) volumetric content are encoded at an encoding computing device (e.g. encoder) using views of the 3D volumetric content that are packed into a 2D atlas. Additionally, geometric information, such as depth values for the 3D volumetric content are encoded using corresponding views that are packed into the 2D atlas or a complimentary 2D atlas that includes depth views that corresponds with the attribute value views of the first 2D atlas. As a part of generating the 2D atlas or complimentary set of 2D atlases (attribute and depth) at least some redundant information that is shown in multiple ones of the views is removed, such that the redundant information is not repeated in multiple views included in the atlas or set of complimentary atlases. The reduced portions of a given view may be grouped together into a patch and attribute patch images and depth patch images may be packed into the atlas or the respective complimentary atlases. The packed depth patch images may make up a depth map for the 3D volumetric content. The atlas or set of complimentary atlases (e.g. comprising attributes values and depths) is video encoded as one or more 2D video images and included in a bit stream along with metadata indicating parameters used for generating the atlas/complimentary atlases, such as bounding box sizes and locations for patches comprising the respective views or reduced portions of the respective views (with redundant information omitted) that have been packed into the atlas or set of complimentary atlases. Also, a camera parameter list may be included in the metadata indicating camera positions and locations for cameras that captured the respective views of the 3D object or scene included in the encoded 3D volumetric content.

A decoding computing device (e.g. decoder) receives the video encoded 2D atlas or set of video encoded complimentary 2D atlases along with the metadata. To render the 3D volumetric content, the decoder synthesizes geometry information included in the views of the 2D atlas or the complimentary 2D atlas (e.g. a depth map). However, instead of generating a vertex for each point whose depth is indicated in the depth map, the decoder performs a real-time mesh simplification to generate a simplified mesh that includes fewer vertices than a number of points for which depth values are indicated in the depth map. Accordingly, the simplified mesh can be rendered at the decoding device without requiring as much computational capacity or time to render as would have been the case if the mesh was not simplified at the decoder. Also, the mesh simplification process, as further described herein, may utilize calculations that are easily performed at the decoding device such that the mesh simplification process only delays rendering by a minimal amount of time, such as approximately 1 millisecond or less.

In order to perform the mesh simplification, the decoder subdivides a decoded video image frame comprising the depth map into a plurality of blocks and evaluates the blocks in parallel. If a block only includes padded pixels and does not include encoded depth values, the block is omitted from further evaluation. Also, the decoder determines the blocks such that adjacent blocks have overlapping edges and corners, for example an outer most row or column of pixels of a given block overlaps with an outermost row or column of pixels of an adjacent block. The use of overlapping blocks reduces the introduction of discontinuities in depth due to the simplification process. For example, discontinuities may stretch triangles or create cracks in a rendered mesh, especially if there is a discontinuity in depths due to simplification being performed differently for adjacent blocks. Thus, by requiring the blocks to overlap the introduction of such discontinuities is avoided.

In a first iterative step of evaluating a given block for mesh simplification, the decoder generates a sub-mesh that approximates the depth values for the pixels of the block. For example, two triangles with vertices at the corners of the block may be generated, wherein the sub-mesh formed by the two triangles represents the geometry of the portion of the mesh to be rendered that is signaled using the given block. As an example, if the block is a (4×4) block, instead of generating 16 vertices, one for each pixel signaled in the block, the simplified sub-mesh may initially only include 4 vertices, e.g. a vertex at each corner of the block. In a next step of evaluating the given block, the decoder performs a bilinear interpolation to estimate depth values for the pixels other than the corner pixels of the block. The bi-linear interpolation provides a simple way to approximate depths of the sub-mesh at the other pixels values of the block. These interpolated depth values may be compared to actual depth values signaled in the depth map for the pixels of the block (such as pixels other than the corner pixels). If the comparison yields differences greater than a threshold level of acceptable distortion, then the block may be further subdivided into a set of smaller sub-blocks and a similar process may be repeated for each of the sub-blocks. Thus, if the block is sub-divided into 4 sub-blocks that share vertices, a vertices count for the vertices to be rendered for the sub-divided block may be 9 vertices as opposed to 16 vertices if mesh simplification was not used (e.g. four corner vertices for the block, four corner vertices of the sub-blocks dividing the edges of the block, and a corner vertex of the sub-blocks at the center of the block where the interior corners of the sub-blocks meet).

In some embodiments, an additional re-meshing process may be applied to the simplified sub-meshes to further avoid cracks or stretching of triangles. For example, elongated triangles (e.g. triangles with vertices that are separated by more than a threshold distance) may be considered for re-meshing. Also, in some embodiments, the metadata received by the decoder may indicate portions of the mesh that are important regions, such as regions falling on a depth discontinuity, or regions wherein distortion is more easily appreciated such as a region corresponding to a person's face. In such embodiments, a re-meshing may be used to increase a vertices count/triangle count in the important regions by generating additional triangles for these regions in the simplified mesh, wherein the simplified mesh is generated as discussed above based on block sub-division and evaluation for distortion.

BRIEF DESCRIPTION OF THE DRAWINGS

FIG. 4 illustrates a block diagram for an encoder configured to encode three-dimensional (3D) volumetric content, according to some embodiments.

FIG. 5 illustrates a block diagram for a decoder configured to decode the encoded 3D volumetric content, wherein the decoder includes real-time mesh simplification, according to some embodiments.

Figure 1A:
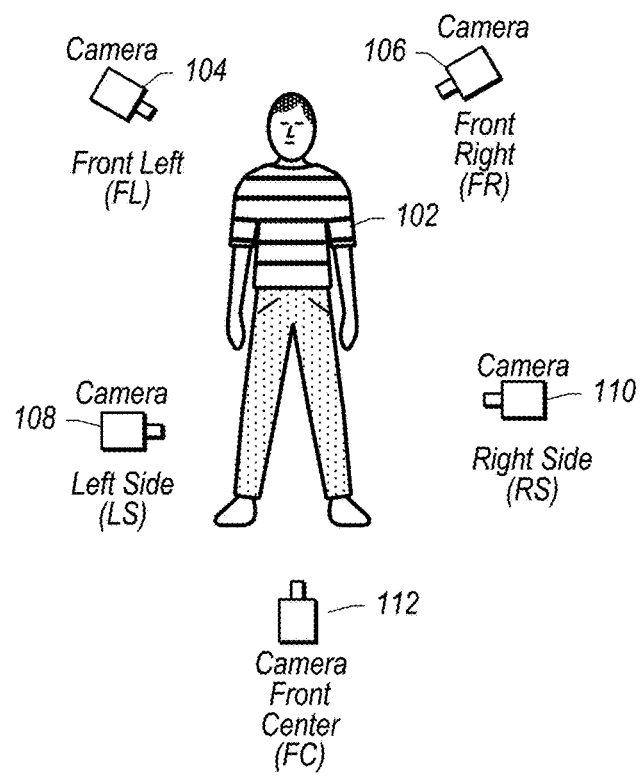
FIG. 1A illustrates a front view of a plurality of cameras located at different locations and/or camera angles relative to an object or scene, wherein the cameras capture images of the object or scene, and wherein the captured images are used to generate three-dimensional volumetric content representing the object or scene, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture three-dimensional (3D) volumetric content has increased. Also, the development of advanced display technologies, such as virtual reality, augmented reality, cross reality, etc. has increased potential uses for 3D volumetric content. However, 3D volumetric content files are often very large and may be costly and time-consuming to store and transmit. Also, such large files may be computationally intensive to render at display devices. For example, such 3D volumetric content may require generating and rendering a large number of vertices which may overwhelm computational capabilities of a given rendering device and/or may slow down the rendering process.

In some embodiments, an encoder may be used to generate a compressed version of the 3D volumetric content to reduce costs and time associated with storing and transmitting large 3D volumetric content files. In some embodiments, a system may include an encoder that compresses attribute and/or spatial information of a volumetric point cloud or immersive video content file such that the file may be stored and transmitted more quickly than non-compressed volumetric content and in a manner such that the compressed volumetric content file may occupy less storage space than non-compressed volumetric content. In some embodiments, such compression may enable 3D volumetric content to be communicated over a network in real-time or in near real-time, or on-demand in response to demand from a consumer of the 3D volumetric content.

In some embodiments, a system may include a decoder that receives encoded 3D volumetric content comprising video encoded attribute information and video encoded geometry information via a network from a remote server or other storage device that stores or generates the volumetric content files. For example, a 3-D display, a holographic display, or a head-mounted display may be manipulated in real-time or near real-time to show different portions of a virtual world represented by 3D volumetric content. In order to update the 3-D display, the holographic display, or the head-mounted display, a system associated with the decoder may request data from the remote server based on user manipulations (or anticipated user manipulations) of the displays, and the data may be transmitted from the remote server to the decoder in a form of encoded 3D volumetric content (e.g. video encoded attribute patch images and video encoded depth patch images/depth maps). The displays may then be updated with updated data responsive to the user manipulations, such as updated views.

However, instead of rendering a mesh representing the 3D object or scene that includes a vertex for each pixel included in the depth patch images/depth maps, a decoding computing device (e.g. decoder) performs real-time mesh simplification. For example, the decoder models a set of pixels corresponding to a block of an image frame comprising the depth patch images/depth map as a sub-mesh comprising a set of mesh surfaces such as triangles that are oriented in a way that approximates the depth values of the set of pixels of the depth map for that block, but without generating a vertex for each pixel. For example, for a four pixel by four pixel block (which includes 16 pixels total), instead of rendering a mesh comprising 16 vertices-one for each pixel in the depth map—the decoder may instead render a sub-mesh comprising two triangles and four vertices total, wherein the surfaces of the triangles approximate the depth values of the internal pixels of the block. Furthermore, the decoder may compare the depth values approximated by the sub-mesh to the actual depth values signaled in the depth map and, if it is determined that the error is greater than a threshold amount, the decoder may further sub-divide the block into sub-blocks. The decoder may then carry out a similar process for the sub-blocks to determine if sub-meshes approximating the sub-blocks result in error less than the threshold, or whether the sub-blocks should be further sub-divided. As can be seen such a simplification process may considerably reduce a number of vertices to be rendered at the decoding device as compared to rendering a mesh with a same number of vertices as pixels signaled in the depth map.

Also, in some embodiments, the threshold error value may be dynamically determined. For example, based on available computational capacity of the decoding device to render vertices, the decoding device may dynamically adjust the acceptable error threshold up or down. Also, in some embodiments, metadata may be signaled to the decoder with the encoded video image frames comprising the packed attribute patch images and the packed depth patch images. For example, the metadata may identify important portions of the 3D volumetric content, such as depth discontinuities or a region of interest, such as a person's face. Additionally, the metadata may define alternative error thresholds to be used for these portions of the 3D volumetric content. For example, less error in depths may be tolerated for portions of a rendered mesh representing the person's face than may be tolerated on a portion of the rendered mesh representing the person's arm or leg, as an example.

Also, in some embodiments, the error threshold may be dynamically determined for a given block, set of blocks based on a gaze or viewing direction of a user device that is to render the 3D volumetric content. For example, portions of the mesh in a direct line of sight of the gaze of the user device may be assigned a dynamically determined error threshold that tolerates less depth error in the region directly in the line of sight than may be acceptable for other regions of the mesh that are only in a periphery of the line of sight. Moreover, as the user device is manipulated to change its gaze direction, the error threshold may be dynamically updated based on the updated gaze direction. For example, in some embodiments, the user device rendering the 3D volumetric content may include an inertial measurement unit or other type of sensor that is configured to determine an orientation of the device in relation to viewing the mesh.

In some embodiments, as part of generating the 3D volumetric content sensors may capture attribute information for one or more points, such as color attributes, texture attributes, reflectivity attributes, velocity attributes, acceleration attributes, time attributes, modalities, and/or various other attributes. For example, in some embodiments, an immersive video capture system, such as that may follow MPEG immersive video (MIV) standards, may use a plurality of cameras to capture images of a scene or object from a plurality of viewing angles and/or locations and may further use these captured images to determine spatial information for points or surfaces of the object or scene, wherein the spatial information and attribute information is encoded using video-encoded attribute image patches and video encoded depth patch images/depth maps as described herein.

Generating 3D Volumetric Content

In some embodiments, 3D volumetric content that is to be encoded/compressed and decoded/decompressed, as described herein, may be generated from a plurality of images of an object or scene representing multiple views of the object or scene, wherein additional metadata is known about the placement and orientation of the cameras that captured the multiple views.

For example, FIG. 1A illustrates an object (person 102) for which multiple images are being captured representing multiple views of the object, when viewed from cameras located at different locations and viewing angles relative to the object.

In FIG. 1A cameras 104, 106, 108, 110, and 112 view person 102 from different camera locations and/or viewing angles. For example, camera 112 captures a front center (FC) view of person 102, camera 108 captures a left side (LS) view of person 102, camera 110 captures a right side (RS) view of person 102, camera 104 captures a front left (FL) view of person 102, and camera 106 captures a front right (FR) view of person 102.

Figure 1B:
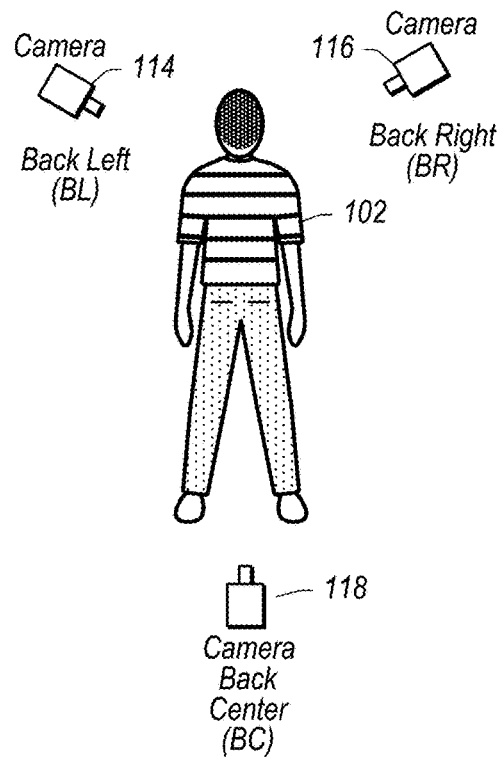
FIG. 1B illustrates a back view showing additional cameras located at different locations and/or camera angles relative to the object or scene, wherein the additional cameras capture images of the object or scene that are used to generate the three-dimensional volumetric content representing the object or scene, according to some embodiments.

FIG. 1B illustrates additional cameras that may be located behind person 102. For example, camera 118 captures a back center (BC) view of person 102, camera 114 captures a back left (BL) view of person 102, camera 116 captures a back right (BR) view of person 102, etc.

Figure 1C:
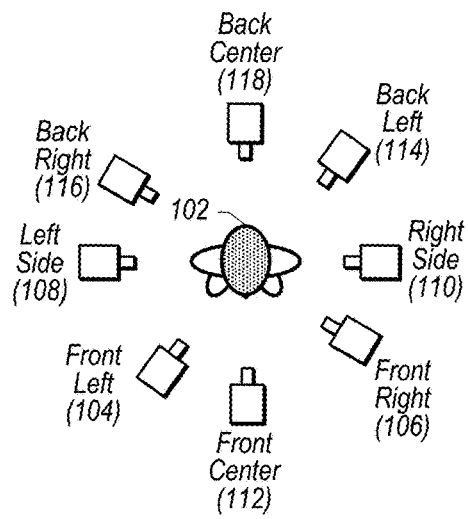
FIG. 1C illustrates a top view showing the cameras and the additional cameras located at the different locations and/or camera angles relative to the object or scene, wherein the cameras and the additional cameras capture the images of the object or scene that are used to generate the three-dimensional volumetric content representing the object or scene, according to some embodiments.

FIG. 1C is a top view illustrating the cameras shown in FIGS. 1A and 1B that are located at different locations and viewing angles relative to person 102. Note that the camera positions and camera angles shown in FIGS. 1A-1C are given as an example configuration and in some embodiments other camera configurations may be used. For example, in some embodiments, when capturing images for a scene, the cameras may face outward towards the scene as opposed to pointing inward towards an object, as shown in FIG. 1C. Also, in some embodiments, the cameras may not necessarily be arranged in a circular configuration, but may instead be arranged in other configurations, such as a square, rectangle, grid pattern, etc.

Figure 1D:
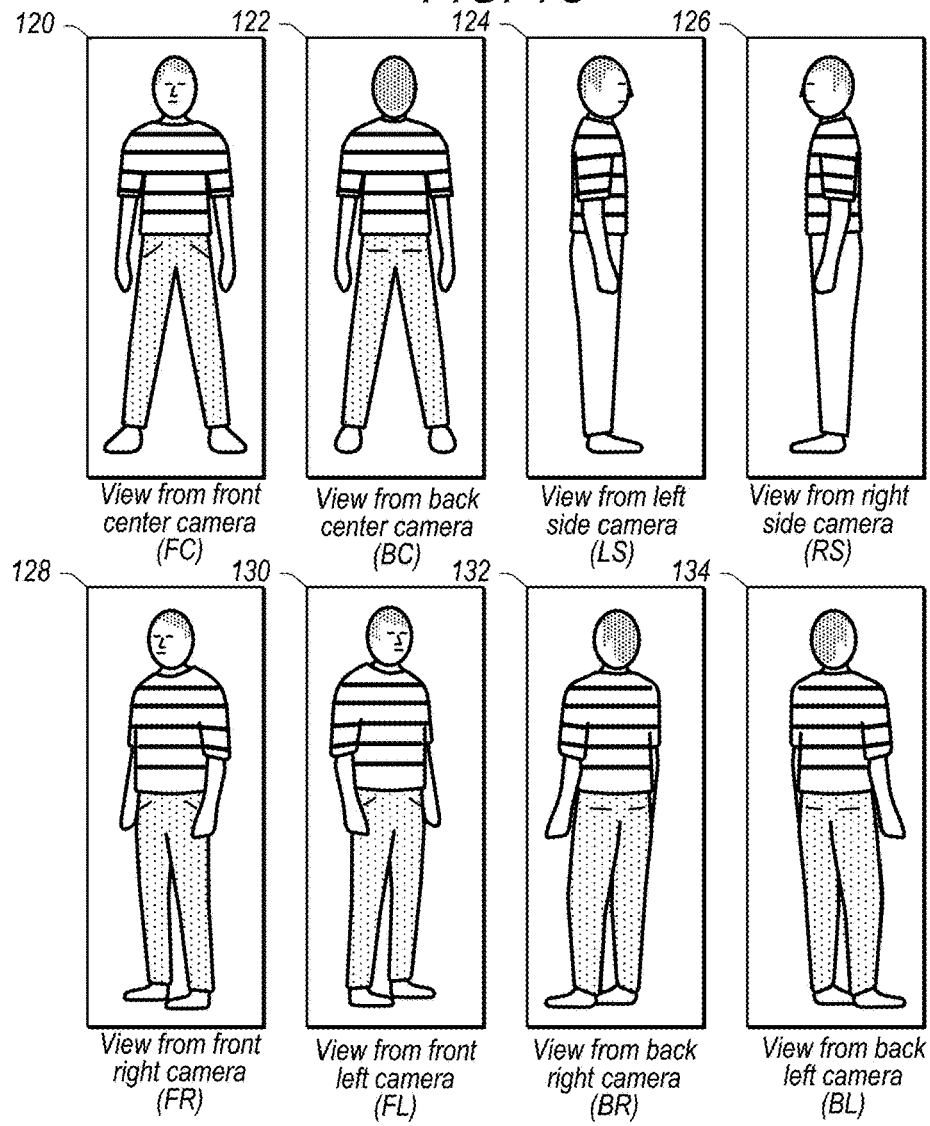
FIG. 1D illustrates respective views of the object or scene captured by the cameras and the additional cameras located at the different locations and/or camera angles relative to the object or scene, according to some embodiments.

FIG. 1D illustrates images that may have been captured via cameras 104-118 as shown in FIGS. 1C-1D. For example image 120 shows a front center (FC) view, image 122 shows a back center (BC) view, image 124 shows a left side (LS) view, image 126 shows a right side (RS) view, image 128 shows a front right (FR) view, image 130 shows a front left (FL) view, image 134 shows a back right (BR) view, and image 134 shows a back left (BL) view.

In some embodiments, metadata is associated with each of the views as shown in FIG. 1D, wherein the metadata (e.g. source camera parameters) indicate locations and camera angles for the respective cameras 104-118 that were used to capture images 120-134. In some embodiments, this metadata may be used to determine geometry information for the object or scene that is being captured by the respective cameras, such as X, Y, and Z coordinates of points of the object or scene (or other types of spatial information).

For example, a component of an encoder, such as an atlas constructor 410 (as shown in FIG. 4) may use source camera parameters (e.g. metadata indicating source camera parameters 402, such as camera location and orientation) along with the images captured from the cameras to determine distances to surfaces in the captured images from the cameras at the known locations with the known orientations. In turn, spatial information indicating locations in space for the surfaces may be determined using the determined distances from the cameras and the known locations and orientations of the cameras.

Figure 1E:
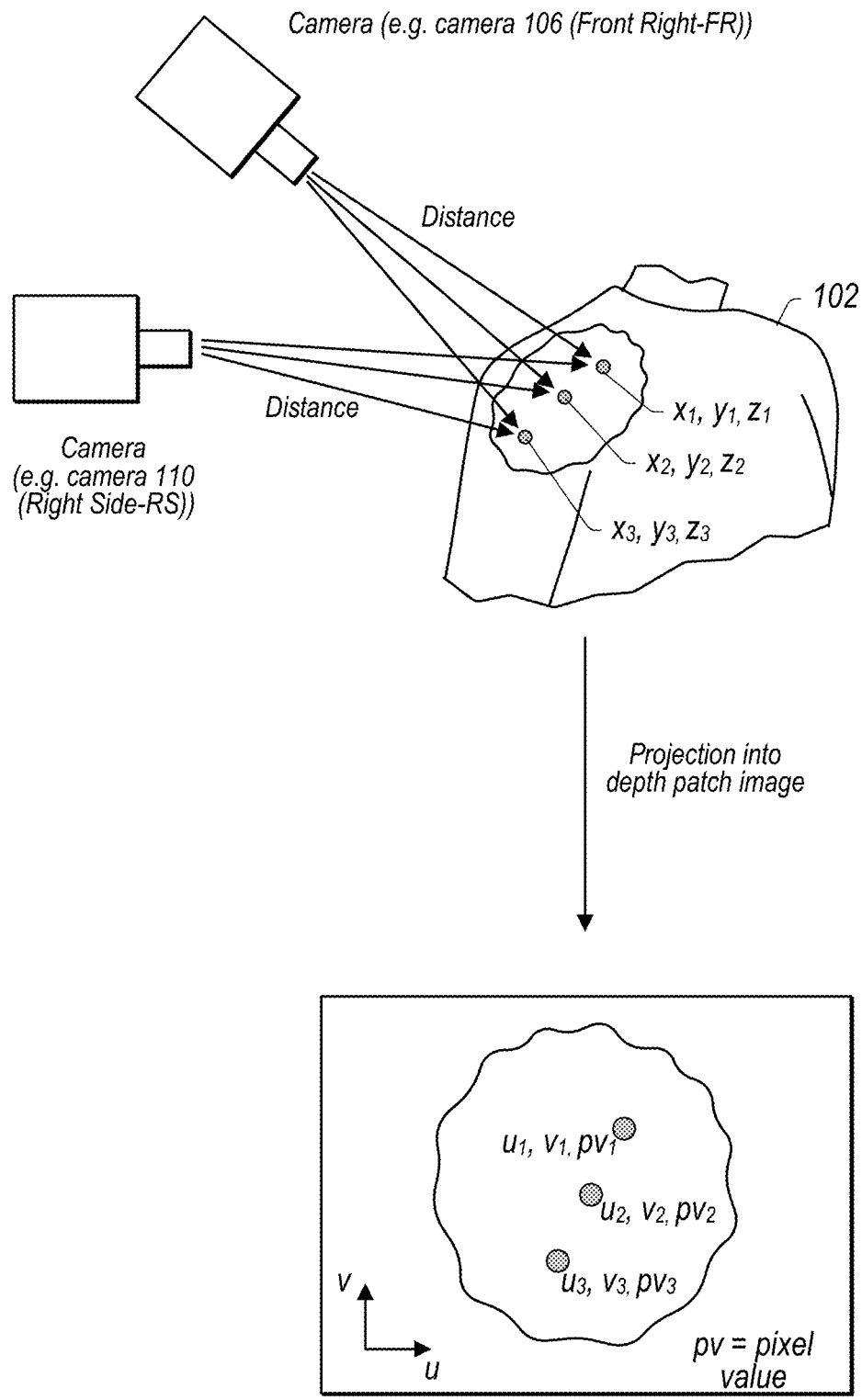
FIG. 1E illustrates depth values for a depth patch image being determined using camera location and camera angle information for multiple cameras that capture images for a same portion of the object or scene from the different locations and/or camera angles, according to some embodiments.

For example, as shown in FIG. 1E, source camera parameters 402 may indicate locations and orientations for right side camera 110 and front right camera 106 that both capture images of a portion of a shoulder of person 102. Moreover, the atlas constructor 410 may determine that the cameras 106 and 110 are both capturing images comprising a same surface of the object (e.g. the portion of the person's shoulder). For example, pixel value patterns in the images may be matched to determine that images from both cameras 106 and 110 are capturing the same portion of the person 102's shoulder. Using the source camera parameters 402 and knowing points in the captured images that are located at a same location in 3D space, the atlas constructor 410 may determine a location in 3D space of the matching portions of the captured images (e.g. the portion of person 102's shoulder). Based on this determination using the known locations and orientations of cameras 106 and 110, the atlas constructor 510 may determine geometry/spatial information for the portion of the object, such as X, Y, and Z coordinates for points included in the matching portion of the person 102's shoulder.

Furthermore, the spatial/geometry information may be represented in the form of a depth map (also referred to herein as a depth patch image). For example, the spatial information for the person's shoulder, e.g. points with coordinates $X_1, Y_1, Z_1; X_2, Y_2, Z_2;$ and $X_3, Y_3, Z_3$, may be projected onto a flat plane of a depth map, wherein the X and Y spatial information is represented by a location of a given point in the depth map. For example, X values may be represented by locations of the points along a width of the depth map (e.g. the "U" direction) and Y values may be represented by locations of the points along the height of the depth map (e.g. the "V" direction). Moreover, the Z values of the points may be represented by pixel values ("pv") associated with the points at locations (U, V). For example, a first point with coordinates in 3D space of $X_1, Y_1, Z_1$ may be represented in the depth map at pixel $(U_1, V_1)$ which has pixel value $pv_1$, wherein darker pixel values indicate lower Z values and lighter pixel values indicate greater Z values (or vice versa).

In some embodiments, depth maps may only be generated for views that are to be included in an atlas. For example, depth maps may not be generated for redundant views or redundant portions of views that are omitted from the atlas. Though, in some embodiments, image data and source camera parameters of all views may be used to generate the depth maps, but the redundant views may not be included in the generated depth maps. For example, whereas cameras 106 and 110 capture redundant information for the person 102's shoulder, a single depth map may be generated for the two views as opposed to generating two redundant depth maps for the person's shoulder. However the images captured from cameras 106 and 110 that redundantly view the person's shoulder from different locations/camera viewing angles may be used to determine the spatial information to be included in the single depth map representing the person's shoulder.

Encoding 3D Volumetric Content

Figure 2:
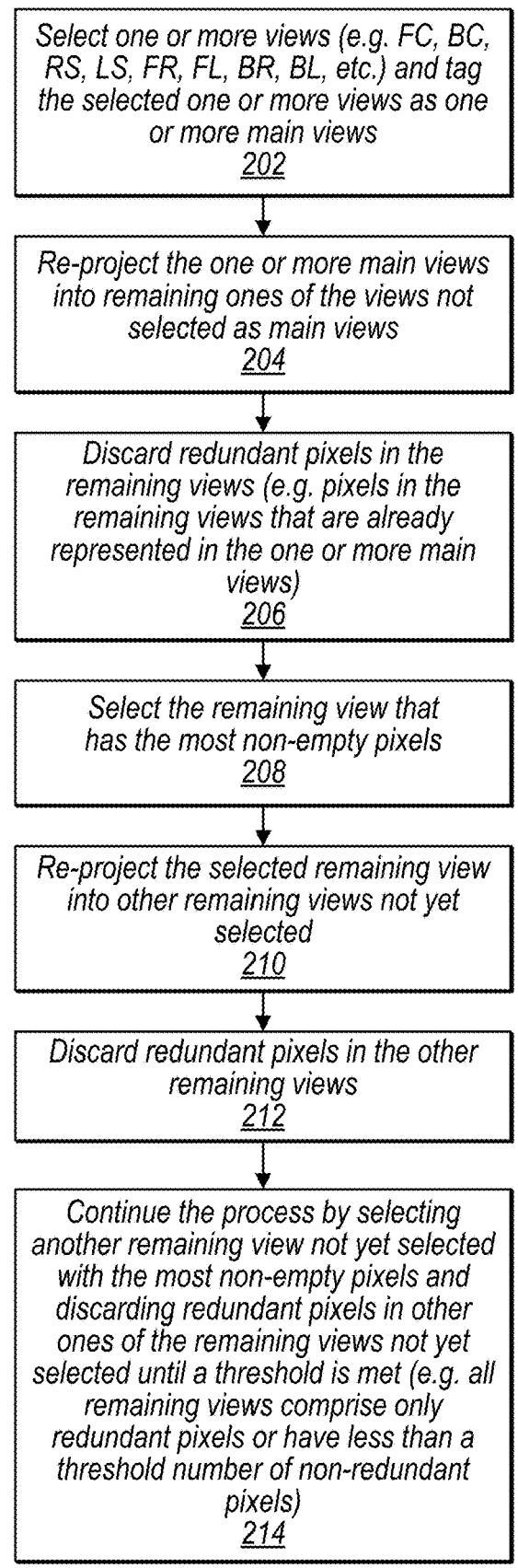
FIG. 2 illustrates a flowchart for an example process for generating an atlas from the captured views, wherein redundant information included in a given view already included in the atlas is omitted from other views that are to be included in the atlas, according to some embodiments.

FIG. 2 illustrates a flowchart for an example process for generating an atlas from the captured views, wherein redundant information already included in a given view already included in the atlas is omitted from other views that are to be included in the atlas, according to some embodiments.

At block 202, a view optimizer (such as view optimizer 406 of the encoder shown in FIG. 4) receives source views comprising both attribute and depth information, such as source views comprising views 120-134 illustrated in FIG. 1D. The view optimizer also selects one of the received views as a main view. In some embodiments, the view optimizer may also receive source camera parameters, such as source camera parameters 402, which indicate locations and orientations of the cameras that captured the source views.

The view optimizer may select one or more main views and tag the selected views as main views. In order to determine a ranking (e.g. ordered list of the views) at block 204 the view optimizer then re-projects the selected one or more main views into remaining ones of the views that were not selected as main views. For example, the front center view (FC) 120 and the back center view (BC) 122 may be selected as main views and may be re-projected into the remaining views, such as views 124-134. At block 206, the view optimizer determines redundant pixels, e.g. pixels in the remaining views that match pixels of the main views that have been re-projected into the remaining views. For example, portions of front right view 128 are redundant with portions of front center view 120, when pixels of front right view 128 are re-projected into front center view 120. In the example, these redundant pixels are already included in the main view (e.g. view 120 from the front center (FC)) and are omitted from the remaining view (e.g. view 128 from the front right (FR)).

The view optimizer (e.g. view optimizer 406) may iteratively repeat this process selecting a next remaining view as a "main view" for a subsequent iteration and repeat the process until no redundant pixels remain, or until a threshold number of iterations have been performed, or another threshold has been met, such as less than X redundant pixels, or less than Y total pixels, etc. For example, at block 208 the re-projection is performed using the selected remaining view as a "main view" to be re-projected into other ones of the remaining views that were not selected as "main views" for this iteration or a previous iteration. Also, at block 212 redundant pixels identified based on the re-projection performed at 210 are discarded. At block 214 the process (e.g. blocks 208-212) are repeated until a threshold is met (e.g. all remaining views comprise only redundant pixels or have less than a threshold number of non-redundant pixels, etc.). The threshold may be measured also be based on all of the remaining views having empty pixels (e.g. they have already been discarded) or all of the remaining views have less than a threshold number of non-empty pixels.

The ordered list of views having non-redundant information may be provided from the view optimizer (e.g. view optimizer 406) to an atlas constructor of an encoder (e.g. atlas constructor 410 as shown in FIG. 4). Additionally, the source camera parameters 402 may be provided from the view optimizer 406 to the atlas constructor 410.

The atlas constructor 410 may prune the empty pixels from the respective views (e.g. the pixels for which redundant pixel values were discarded by the view optimizer 406). This may be referred to as "pruning" the views as shown being performed in atlas constructor 410. The atlas constructor 410 may further aggregate the pruned views into patches (such as attribute patch images and geometry patch images) and pack the patch images into respective image frames.

Figure 3:
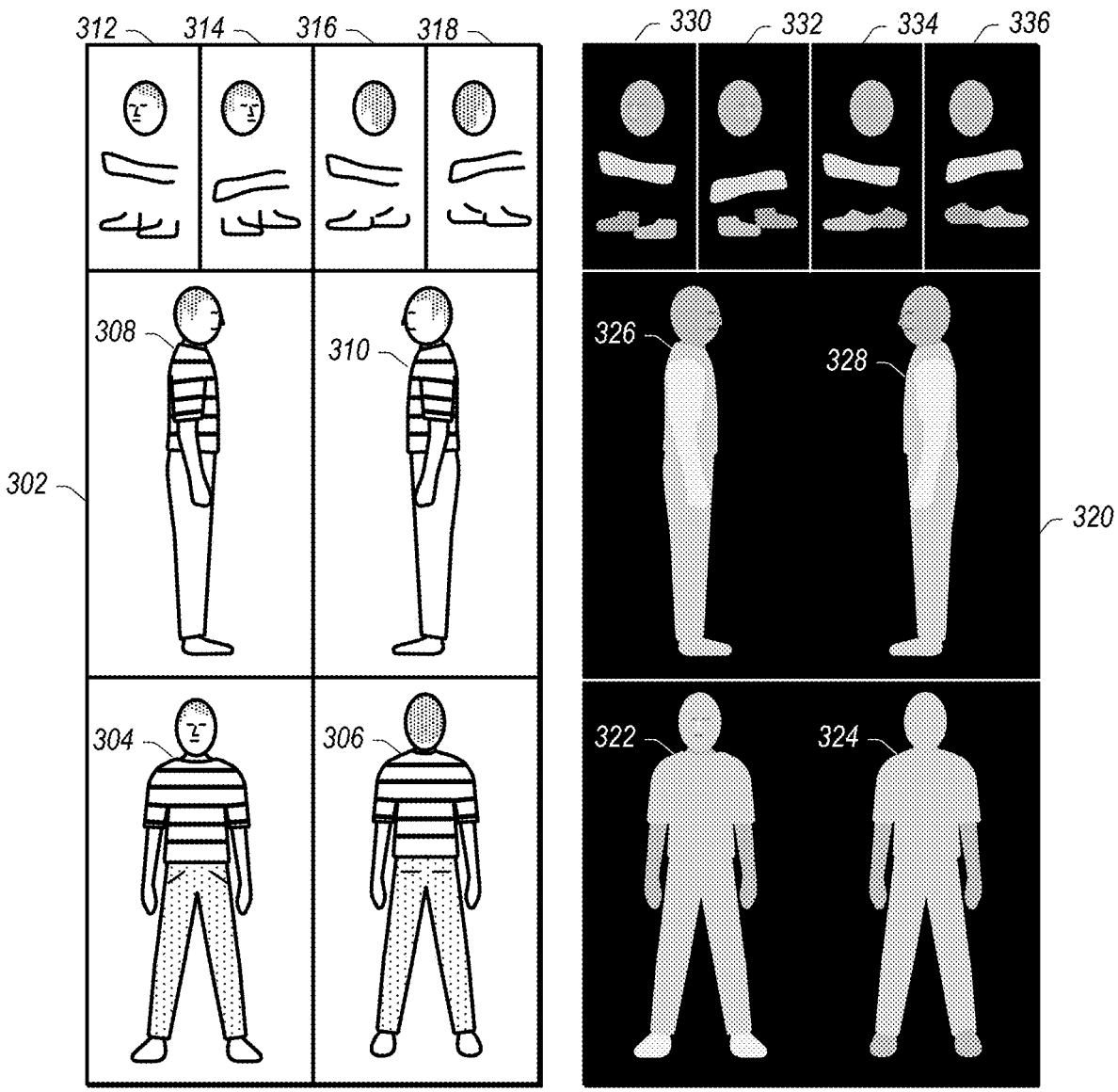
FIG. 3 illustrates an atlas comprising packed attribute patch images representing views included in the atlas, wherein redundant information has been omitted and also illustrates a corresponding atlas/depth map comprising depth patch images that correspond with the attribute patch images included in the adjacent attribute patch image atlas, according to some embodiments.

For example, FIG. 3 illustrates an atlas comprising packed attribute patch images representing views included in the atlas, wherein redundant information has been omitted and also illustrates a corresponding atlas/depth map comprising depth patch images that correspond with the attribute patch images included in the adjacent attribute patch image atlas, according to some embodiments.

Attribute patch images 304 and 306 for main views 120 and 122 are shown packed in the atlas 302. Also, patch images 308 and 310 comprising non-redundant pixels for views 124 and 126 are shown packed in atlas 302. Additionally, attribute patch images 312, 314, 316, and 318 comprising non-redundant pixels for remaining views 128, 130, 132, and 134 are shown packed in atlas 302.

Atlas 320/depth map 320 comprises corresponding depth patch images 322-336 that correspond to the attribute patch images 304-318 packed into attribute atlas 302.

FIG. 4 illustrates a block diagram for an encoder configured to encode three-dimensional (3D) volumetric content using video encoded attribute patch images and simplified mesh-based representations that are mesh encoded, according to some embodiments.

As discussed above, source camera parameters 402 indicating location and orientation information for the source cameras, such as cameras 104-118 as illustrated in FIGS.

1A-1C are provided to the view optimizer 406. Also source views 404 which, include both attributes (e.g. colors, textures, etc.) and depth information are provided to view optimizer 406. The view optimizer 406 determines main views and remaining views as discussed in regard to FIG. 2. The view optimizer 406 and/or the pruner of atlas 410 may further disregard redundant pixels as described in FIG. 2. For example, the view optimizer may mark redundant pixels as empty and the pruner of atlas constructor 410 may prune the empty pixels. Note, the main views and remaining views along with camera lists comprising source camera parameter metadata comprising location and orientation information for the cameras that captured the main and remaining views are provided to atlas constructor 410. As shown in FIG. 4, the atlas constructor 410 prunes the views (main and remaining) to remove empty pixels. The atlas constructor 410 further aggregates the pruned views into patches and packs the patches into a 2D video image frame. For example, in atlas 302 redundant/empty pixels have been pruned from views 128, 130, 132, and 134. Also as shown in atlas 302 for views 128, 130, 132, and 134, the remaining (non-pruned) portions of these views have been aggregated into attribute patch images 312, 314, 316, and 318. These attribute patch images have further been packed into atlas 302, which may have a same size/resolution as the video image frame comprising the attribute patch images (e.g. atlas 302). It is worth pointing out that white space has been included in atlas 302 for ease of illustration. However, in at least some embodiments, the non-redundant portions of the views may be more closely packed into smaller patch images with less open space than what is shown in FIG. 3.

Packed atlas 302 may be provided to encoder 416 which may video encode the attribute patch images and video encode the depth patch images.

Additionally, atlas constructor 410 generates an atlas parameters lists 412, such as bounding box sizes and locations of the patch images in the packed atlas. The atlas constructor 410 also generates a camera parameters list 408. For example, atlas constructor 410 may indicate in the atlas parameters list 412 that an attribute patch image (such as attribute patch image 304) has a bounding box size of M×N and has coordinates with a bottom corner located at the bottom left of the atlas. Additionally, an index value may be associated with the patch image, such as that it is a $1^{st}$, $2^{nd}$ etc. patch image in the index. Additionally, camera parameter list 408 may be organized by or include the index entries, such that camera parameter list includes an entry for index position 1 indicating that the camera associated with that entry is located at position X with orientation Y, such as camera 112 (the front center FC camera that captured view 120 that was packed into patch image 304).

Metadata composer 414 may entropy encode the camera parameter list 508 and entropy encode the atlas parameter list 412 as entropy encoded metadata. The entropy encoded metadata may be included in a compressed bit stream long with video encoded packed image frames comprising attribute patch images that have been encoded via encoder 416 and along with video encoded depth patch images/depth map that have been video encoded via encoder 416.

Decoding 3D Volumetric Content with Real-Time Mesh Simplification

FIG. 5 illustrates a block diagram for a decoder configured to use video encoded attribute patch images and video encoded depth map to generate a reconstructed version of encoded 3D volumetric content, according to some embodiments.

The compressed bit stream may be provided to a decoder, such as the decoder shown in FIG. 5. The entropy encoded metadata may be directed to a metadata parser 504 and the video encoded image frames comprising attribute patch images packed in the image frames and also the depth patch images packed in the same image frame or an additional image frame may be provided to decoder 502, which may video decode the attribute image frames and the depth image frames (e.g. depth maps). The decoded atlas (or set of complimentary decoded atlases) comprising attribute patch images and depth patch images may be provided to reference renderer 508 along with atlas patch occupancy maps that have been generated by atlas patch occupancy map generator 506 using the entropy decoded atlas parameter list. Also, the camera view metadata included in the entropy decoded metadata may be provided to reference renderer 508. For example, camera parameter list metadata may be used by reference renderer 508 to select a given view of the 3D volumetric content to render based on a user manipulation of the viewport (e.g. viewing position and viewing orientation information received by the reference renderer 508).

The reference renderer 508 includes a real-time mesh simplification module 510 configured to reduce an amount of vertices to be included in synthesized meshes generated to render the 3D volumetric content such that the synthesized meshes have fewer vertices than un-simplified meshes but also limit a degree to which the meshes are simplified such that distortion or errors resulting from the simplification of the meshes is less than a threshold level of acceptable error. In some embodiments, the threshold level of acceptable error may be dynamically determined.

Figure 6:
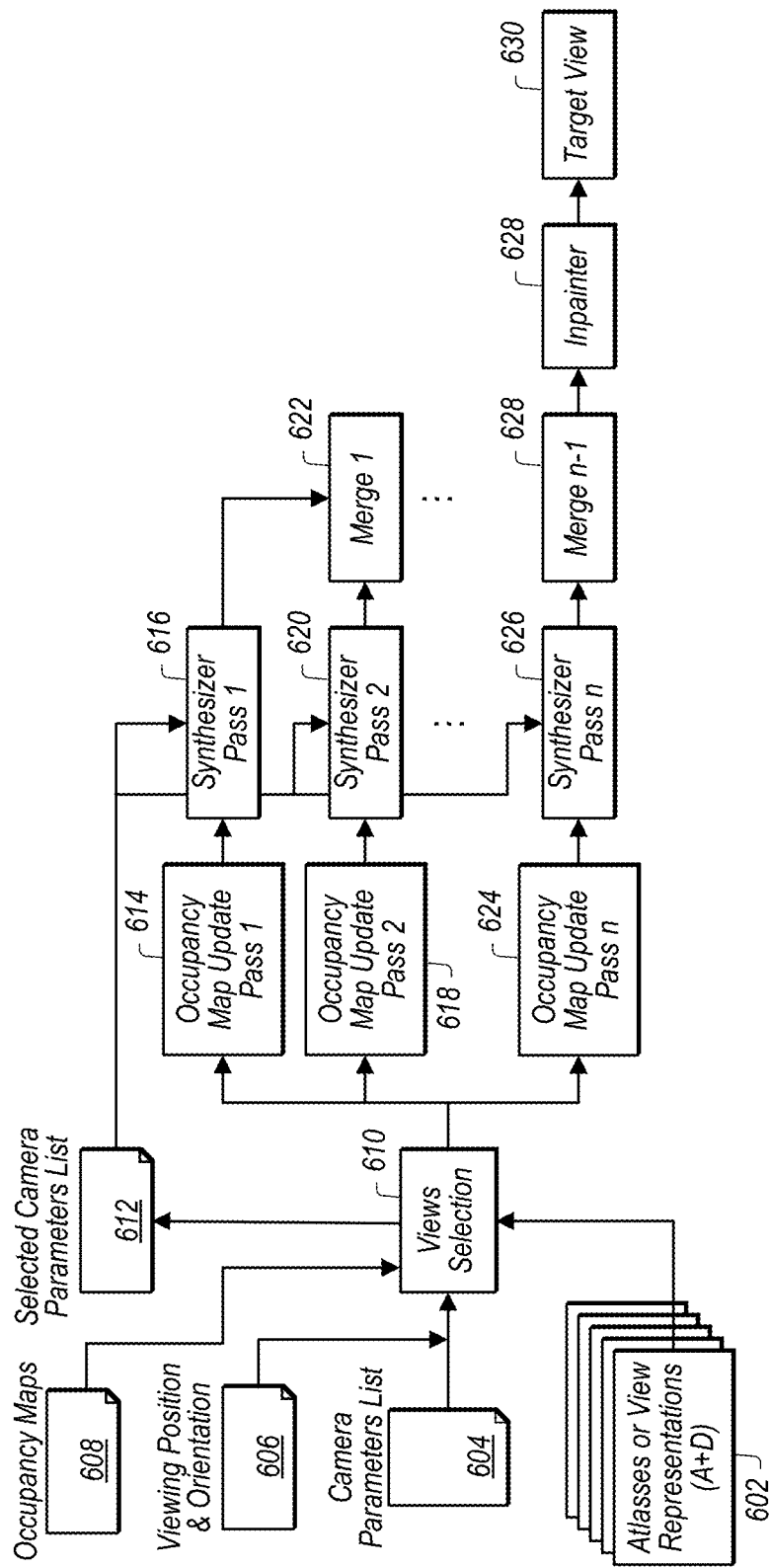
FIG. 6 illustrates a block diagram showing additional processes performed by a reference renderer to render three-dimensional (3D) volumetric content based on views, according to some embodiments.

For example, FIG. 6 illustrates a block diagram showing additional processes performed by a reference renderer, such as reference renderer 508, to render three-dimensional (3D) volumetric content based on views, according to some embodiments.

Figure 15:
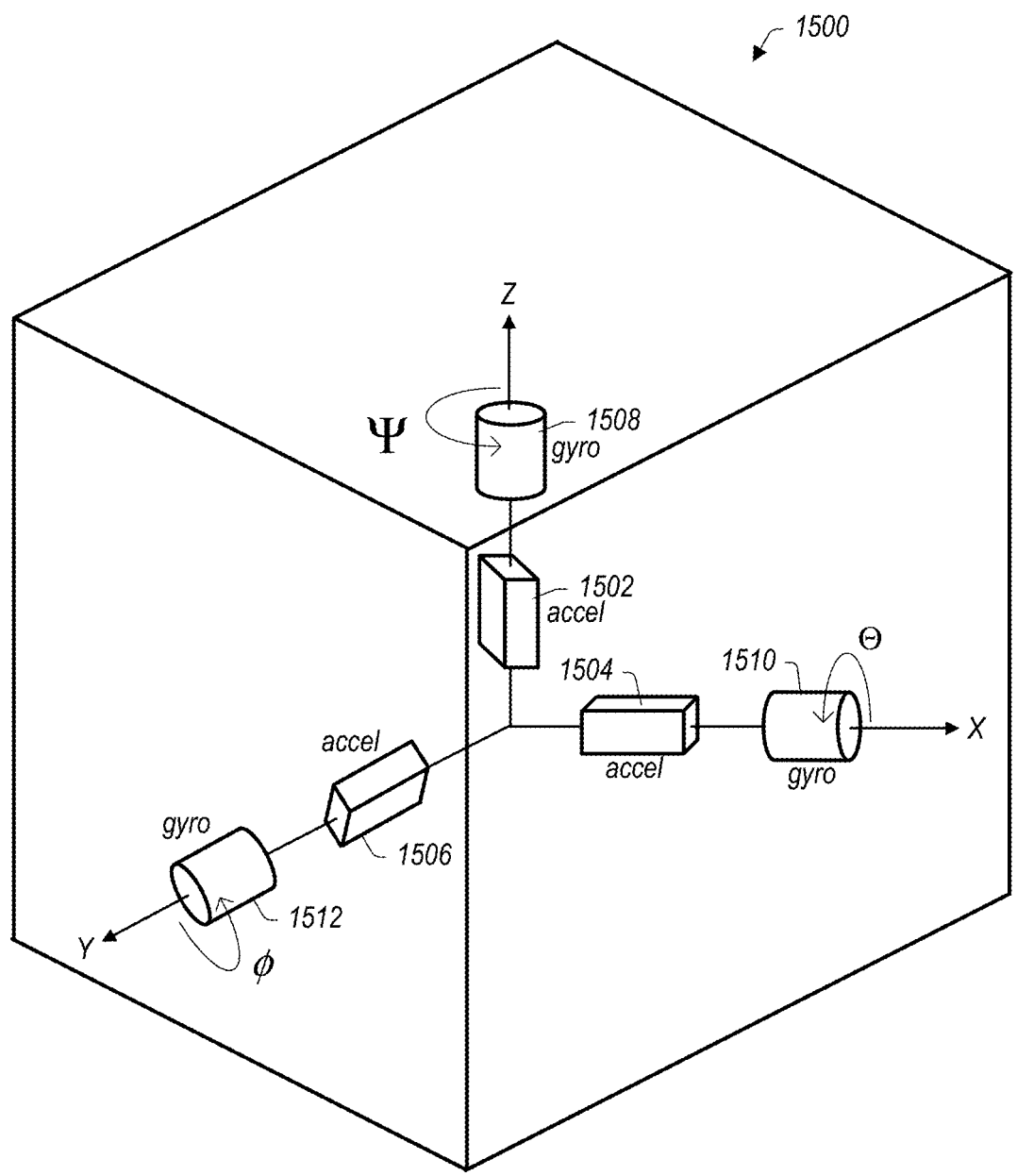
FIG. 15 illustrates an example inertial measurement unit (IMU) that may be included in a decoding device, according to some embodiments.

The reference renderer (such as reference renderer 508 illustrated in FIG. 5) receives viewing and position orientation information 606 from a rendering device that is to display the rendered 3D volumetric content. For example the rendering device may include an inertial measurement unit (IMU) as illustrated in FIG. 15 that includes gyroscopes that determine an orientation of the rendering device in relation to the 3D volumetric content to be rendered. Additionally, the reference renderer receives camera parameter list 604, which is provided by metadata parser 504 (e.g. camera view metadata "D" as shown in FIG. 5). Additionally, the reference renderer receives a video decoded atlas comprising attribute patch images (e.g. colors, textures, etc.) and also receives a video decoded complementary atlas comprising depth patch images (e.g. a depth map). Also, the reference renderer 508 receives occupancy maps 608 for the atlases. Note that in some embodiments the attribute atlas and the depth atlas/depth map may be video encoded in a same image frame or using separate image frames. These are shown in FIG. 6 as atlas or view representations 602, which have been video decode by decoder 502 as shown in FIG. 5. Based on the viewing position and orientation for the viewport indicated in viewing and position and orientation information 606, a view selection component 610 of the reference renderer 508 selects particular ones of the views included in the atlases that are to be rendered.

Based on the selected views, occupancy map update pass 1 (614) identifies portions of the atlases (e.g. decoded video image frames comprising packed attribute patch images and packed depth patch images) that include patches comprising a main view to be rendered. The occupancy map update pass 1 (614) provides these patches, which may include view components packed into a bounding box of a patch for the main view, to the synthesizer 616 for pass 1. For example, the occupancy map update module 614 may identify depth patch 322 as shown in FIG. 3 as a patch for a main view to be synthesized.

However, instead of generating a mesh vertex for each pixel shown in the main view patch, such as depth patch image 322, the synthesizer may further perform a real-time mesh simplification (e.g. using real-time mesh simplification module 510). The real-time mesh simplification process is further described in detail in FIGS. 7-14. The result of the synthesizer pass 1 (616) is the generation of a simplified sub-mesh representing the portion of the 3D volumetric content shown in the main view. For example, the front center (FC) of the person as shown in view 120 illustrated in FIG. 1D that was the basis for attribute patch image 304 and depth patch image 322 shown in FIG. 3. Thus a mesh representing the front center view of the person is generated, wherein the generated mesh is simplified in the sense that it includes less vertices than would have been the case if a vertex was generated for each pixel value indicating a depth of the front center view of the person as included in depth patch image 322.

Additionally, the reference renderer 508 projects the attribute values for the front center view of the person onto the generated sub-mesh for the front center view of the person. For example, attribute values indicated in attribute patch image 304 are projected onto the simplified mesh generated using the depth information included in depth patch image 322. Thus, a synthesized sub-mesh representing the front center (FC) view of the person 102 is synthesized.

A similar process is carried out for other views. For example, occupancy map update pass 2 (618) may identify depth patch image 328 as corresponding to a next view to be synthesized, wherein depth patch image 328 corresponds to a remaining view representing a right side (RS) view of the person, e.g. view 126 as shown in FIG. 1D. Synthesizer pass 2 (620) generates a simplified sub-mesh representing the portion of the 3D volumetric content shown in the remaining view and projects the attribute values from the corresponding attribute patch image 310 onto the generated simplified sub-mesh. For example, the right side (RS) of the person as shown in view 126 illustrated in FIG. 1D that was the basis for attribute patch image 310 and depth patch image 328 shown in FIG. 3 is synthesized. Then, at 622 the reference renderer merges the two generated sub-meshes together.

This process is then repeated for each of the other views included in the views selected via view selection 610 to be rendered. For example the selected views may be selected based on a viewport view of the person to be rendered in the view port that views the person from the front and right side. Such that the front center (FC) view is visible, the right side (RS) view is visible, and the front right (FR) view is visible. Thus the next view to be synthesized may be the front right (FR) view. Thus, at occupancy map update pass N (624), the reference renderer may identify depth patch image 312 as corresponding to a next view to be synthesized, wherein depth patch image 330 corresponds to a remaining view representing a front right (FR) view of the person, e.g. view 128 as shown in FIG. 1D. Synthesizer pass N (620) generates a simplified sub-mesh representing the portion of the 3D volumetric content shown in the remaining view. For example, the front right (FR) side of the person as shown in view 128 illustrated in FIG. 1D that was the basis for attribute patch image 312 and depth patch image 330 shown in FIG. 3 is synthesized. Then, at 622 the reference renderer merges the generated sub-mesh with the other merged sub-meshes. Note, this process may be repeated for any number of views visible in a target view that is to be rendered.

Next the reference renderer 508 performs an in-painting process 628 to fill in any gaps in the merged sub-meshes by using a linear interpolation to fill the gaps based on values of the sub-meshes on sides surrounding the gap.

Finally, the target view (630) is rendered in the viewport. Note that as the viewport is manipulated, additional views may be rendered following the process as shown in FIG. 6, wherein the meshes to be rendered are simplified in real-time as described in FIGS. 7-14.

For example, in order to discuss the simplification of a mesh for a given view, take the front center view as an example. The depth map/depth patch image 322 provides a starting point for the example. In order to simplify the mesh, the bounding box of the depth map/depth patch image 322 may be divided into overlapping blocks.

For example, FIGS. 7A-7D illustrate an example of overlapping blocks being determined for a portion of an image frame comprising depth map information, according to some embodiments.

Figure 7A:
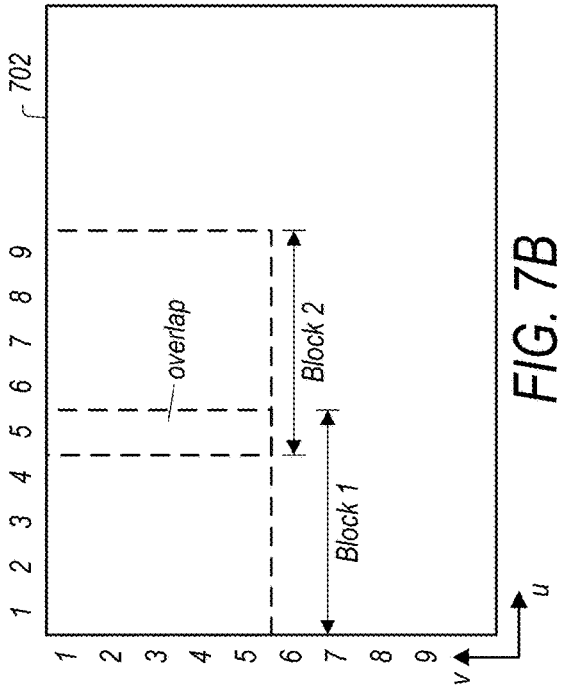
FIGS. 7A-7D illustrate an example of overlapping blocks being determined for a portion of an image frame comprising depth map information, according to some embodiments.

For example, FIG. 7A illustrates a first block (e.g. block 1) being determined for a portion of an image frame 702. For example, portion 702 may correspond to a bounding box size for depth patch image 322 and the pixels of portion 702 may be the pixels of atlas/image frame 320 that are covered by the bounding box for depth patch image 322.

Figure 7B:
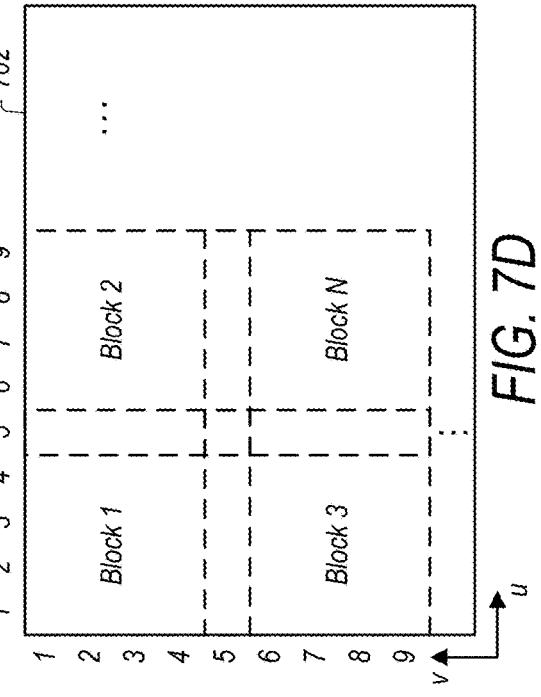
Figure 7C:
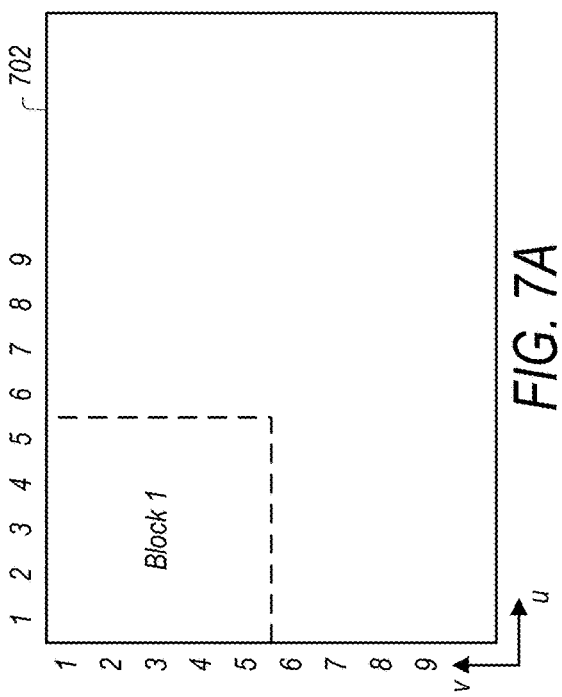
Figure 7D:
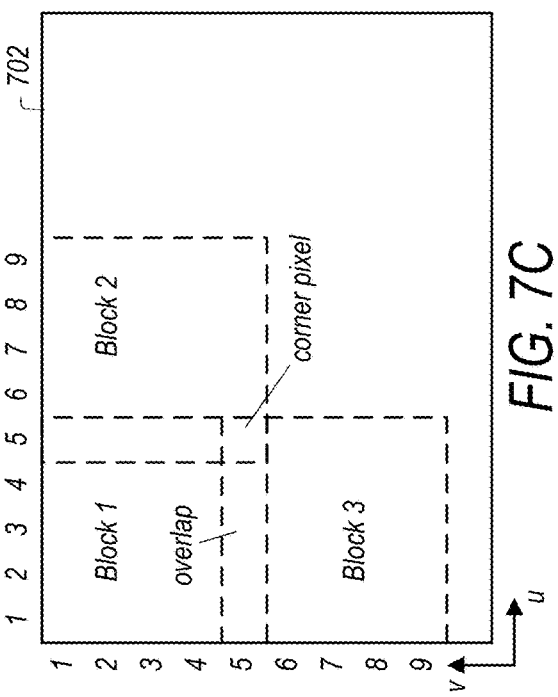

In some embodiments, the blocks may be selected as (M+1)×(N+1) blocks, wherein M=N=4. Thus the blocks may include columns and rows with 4 pixels and 1 edge pixel. For example FIG. 7B illustrates a second block that overlaps the first block by one pixel on the edge adjacent to the first block. FIG. 7C then shows a third block that overlaps the first block and also overlaps the second block at a corner pixel. FIG. 7D shows an additional block (Nth block) that overlaps both the second and third block and also the first block at a corner pixel.

The use of blocks may allow for utilization of GPU and/or CPU parallelization to increase a speed of simplifying a given sub-mesh to be rendered, because each block may be evaluated in parallel.

The use of blocks may also allow for the mesh resolution to be adjusted to the local variability of the depth information (e.g. depth map) such that the mesh resolution can be significantly reduced in local regions where the reduction does not introduce considerable error, but at the same time refraining from reducing (or reducing to a lesser degree) the mesh resolution in local regions where a greater reduction in the mesh resolution would appreciably affect the visual quality of the rendered content.

Also, the error threshold can be varied block by block, region by region, view by view, etc. providing a simple control over the simplification process. Also the error threshold may be dynamically adjusted based on other parameters, such as available computational resources to render the mesh, a current gaze of the viewport, etc. In some embodiments the error threshold may be computed as a local decimation error ($\epsilon$) that is computed as a local maximum error, a local average error, a local median error, a local n-th percentile error, etc. In some embodiments, an error value may be determined for each pixel of a block as a difference between the signaled depth for that pixel, (e.g. the pixel value for the given pixel indicating a depth value or an inverse depth that can be converted into a depth value) and a depth of the simplified mesh surface at the given pixel value, wherein a bi-linear interpolation is used to compute the surface depth value of the sub-mesh at the given location corresponding to a given pixel.

Figure 10:
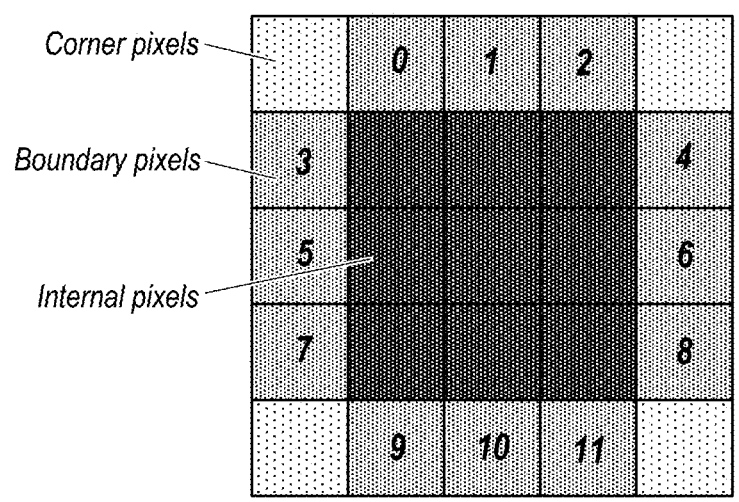
FIG. 10 illustrates pixels of a block, wherein corner pixels are used to interpolate depth values for a sub-mesh encompassing boundary pixels and internal pixels of the block, according to some embodiments.

For example, in order to measure approximation error resulting from the use of the simplified sub-mesh for a given block (or sub-block), interpolated depth values are generated for boundary and internal pixels of the block (or sub-block) based on the values of the four corner pixels in the block. For example, a bilinear interpolation may be used. However, various interpolation techniques could also be used. Note, FIG. 10 illustrates a block and shows corner, pixels, boundary pixels, and internal pixels. The block illustrated in FIG. 10 may be any of the overlapping blocks shown in FIGS. 7A-7D. The decimation error is measured between the original depth values and the interpolated ones. Various metrics could be used for the error such as sum of square errors (SSE), sum of absolute differences (SAD), max error, median error, etc.

Figure 8A:
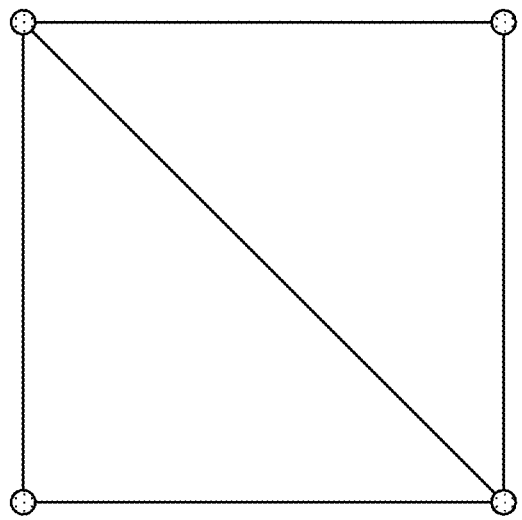
FIG. 8A illustrates a sub-mesh comprising two triangles that is generated for a given block (or sub-block) of a depth map, according to some embodiments.
Figure 8B:
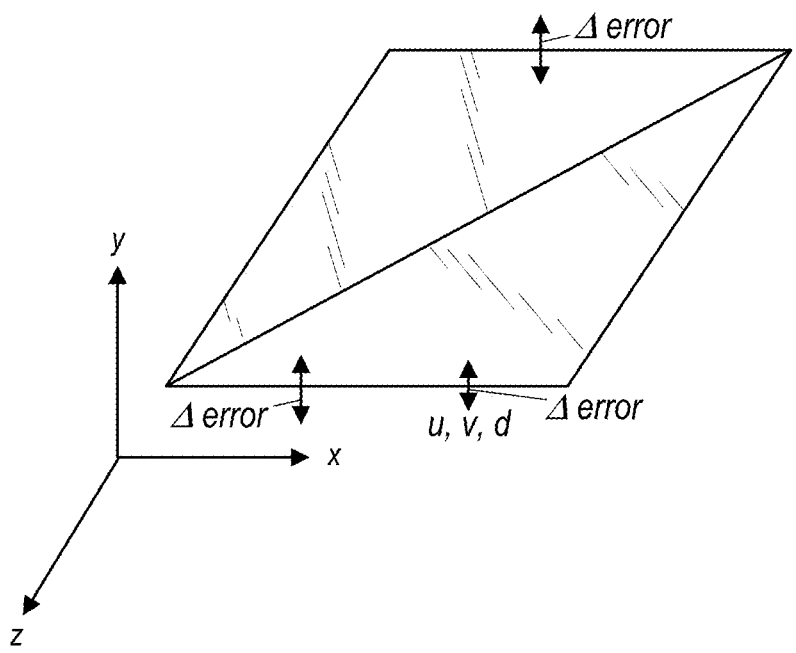
FIG. 8B illustrates errors being determined for depths represented by the sub-mesh in comparison to depth-values of the depth map for the block or sub-block, wherein the errors are used to determine whether or not the block or sub-block is to be further divided into sub-blocks, according to some embodiments.

For example, FIG. 8A illustrates a sub-mesh comprising two triangles that is generated for a given block (or sub-block) of a depth map, according to some embodiments. Also, FIG. 8B illustrates errors being determined for depths represented by the sub-mesh in comparison to depth-values of the depth map for the block or sub-block, wherein the errors are used to determine whether or not the block or sub-block is to be further divided into sub-blocks, according to some embodiments.

Figure 9A:
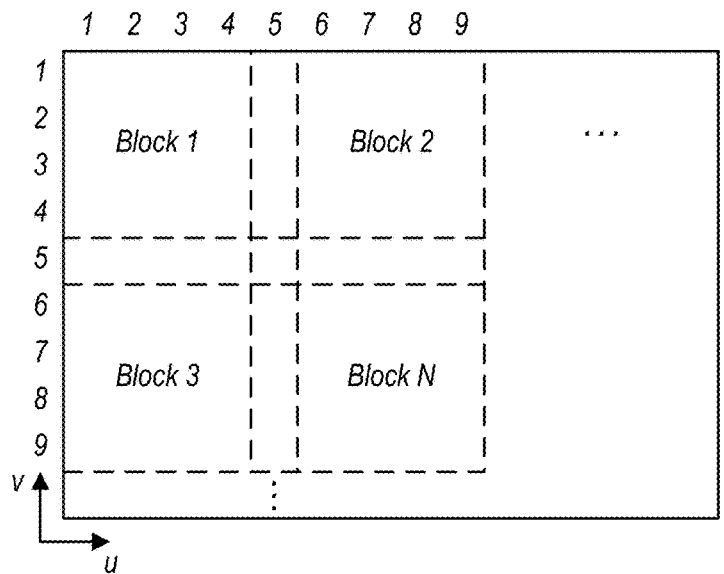
FIGS. 9A-9C illustrate a block determined for a depth map being sub-divided into sub-blocks in response to a determination that distortion introduced when modelling the block as a single sub-mesh (e.g. two triangles) exceeds a distortion threshold, according to some embodiments.
Figure 9B:
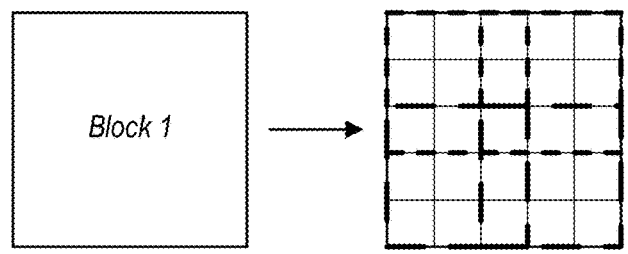
Figure 9C:
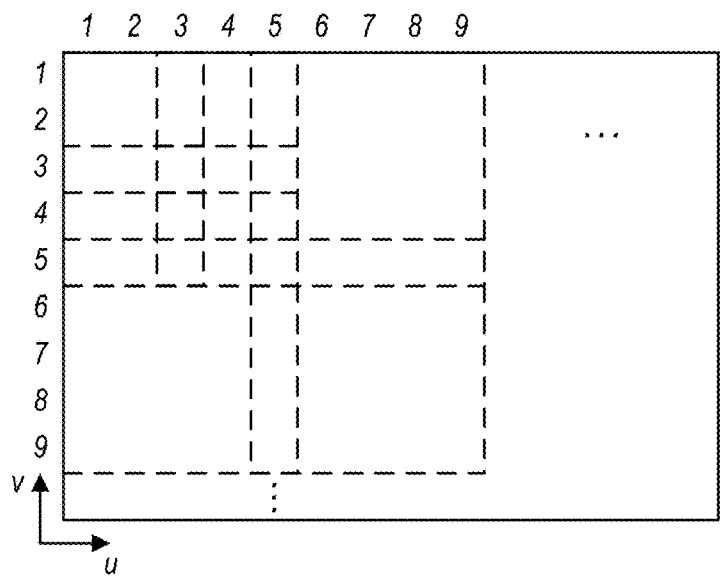

If the approximation error is higher than the threshold then the block is subdivided into four sub-blocks of size (M/2+1)×(N/2+1) as depicted in FIGS. 9A-9C. The same analysis is then applied to the sub-blocks.

For example, FIGS. 9A-9C illustrate a block determined for a depth map being sub-divided into sub-blocks in response to a determination that distortion introduced when modelling the block as a single sub-mesh (e.g. two triangles) exceeds a distortion threshold, according to some embodiments.

Due to the overlapping nature of the blocks, the algorithm needs to make sure that pixels values on block boundaries are consistent between neighboring blocks, in order to avoid generating a mesh with cracks. To achieve this, the following rules are enforced:

- Approximated depth values on boundary pixels assigned by bigger blocks cannot be overwritten by smaller blocks.
- Interpolated values for boundary pixels use only their associated corner pixels.
- The interpolation used for approximating sub-mesh depths for boundary pixels when determining error (in a decision whether or not to further sub-divide a block or sub-block) matches the interpolation used when rendering the sub-mesh for the given block.

In some embodiments, quantized inverse depth values are stored in the pixels of the depth map. Here, the decimation process is applied, while considering the inverse depth in order to give more importance to foreground objects (vs. background). Since the mesh will be finally rendered in the depth space, the linear interpolation needs to guarantee a crack free mesh in that space.

In such embodiments, a pixel (u, v) with a quantized inverse depth $\delta$ could be unprojected to a 3D point P(M) as follows:

$$P^{-1}(u, v, \delta) = M = \begin{bmatrix} x \\ y \\ z \end{bmatrix} = \begin{bmatrix} \dfrac{z \times (u - u0)}{f_u} \\ \dfrac{z \times (v - v0)}{f_v} \\ \dfrac{\text{far} \times \text{near}}{\text{near} + \delta \times qs \times (\text{far} - \text{near})} \end{bmatrix}$$

Where, $f_u$, $f_v$, $u0$, $v0$ are intrinsic camera parameters far, near and qs are parameters used for depth quantization.

Projecting a point P(M) to generate a pixel (u, v) with a inverse depth $\delta$ is given by the following formula:

$$P(M) = P\left(\begin{bmatrix} x \\ y \\ z \end{bmatrix}\right) = \begin{bmatrix} u \\ v \\ \delta \end{bmatrix} = \begin{bmatrix} \dfrac{x \times f_u}{z} + u0 \\ \dfrac{y \times f_v}{z} + v0 \\ \dfrac{\dfrac{1}{z} - \dfrac{1}{\text{far}}}{\dfrac{1}{\text{near}} - \dfrac{1}{\text{far}}} qs \end{bmatrix}$$

Consider a boundary pixel $b(u_B, v_B, \delta_B)$ and the two associated corner pixels $C_0(u_0, V_0, \delta_0)$ and $c_1(u_1, v_1, \delta_1)$. Let $B(x_B, y_B, z_B)$, $C_0(x_0, y_0, Z_0)$ and $c_1(x_1, y_1, Z_1)$ be the unprojected 3D points associated with b, $c_0$ and $c_1$:

$B(x_B, y_B, z_B) = P^{-1}(b)$
$C_0(x_0, y_0, Z_0) = P^{-1}(c_0)$
$C_1(x_1, y_1, Z_1) = P^{-1}(c_1)$

Since B is located on the line segment $[C_0, C_1]$, it could be represented as follows:

$$B = C_0 + a(C_1 - C_0) \quad [1]$$

$$x_B = x_0 + a(x_1 - x_0)$$

$$z_B = z_0 + a(z_1 - z_0)$$

On the other hand, B should verify:

$$P(B) = b \quad [2]$$

$$u_B = \frac{x_B \times f_u}{z_B} + u0$$

$$(u_B - u0)(z_0 + \alpha(z_1 - z_0)) = (x_0 + \alpha(x_1 - x_0)) \times f_u$$

$$\alpha\{(u_B - u0)(z_1 - z_0) - f_u(x_1 - x_0)\} = f_u x_0 - z_0(u_B - u0)$$

$$\alpha = \frac{f_u x_0 - z_0(u_B - u0)}{(u_B - u0)(z_1 - z_0) - f_u(x_1 - x_0)} \quad [3]$$

Equation (3) makes it possible to compute $z_B$ and therefore $\delta_B$ could be computed as follows:

$$\delta_B = \frac{\dfrac{1}{z_B} - \dfrac{1}{\text{far}}}{\dfrac{1}{\text{near}} - \dfrac{1}{\text{far}}} qs$$

Note: the above calculations suppose that $(u_B - u0) \neq 0$, which is the case of boundary pixels 0, 1, 2, 9, 10 and 11 in as shown in FIG. 10. For the remaining boundary pixels in FIG. 10 (i.e., pixels 3, 4, 5, 6, 7 and 8), $(V_B - v0) \neq 0$. Therefore, the same formulas can be applied while replacing u with v.

More generally, if the projection function is highly nonlinear and it is hard to directly solve the system, other approaches like dichotomy, gradient descent or other suitable techniques may be used to solve the non-linear systems.

Avoiding Cracks by Using Re-Meshing

Figure 11A:
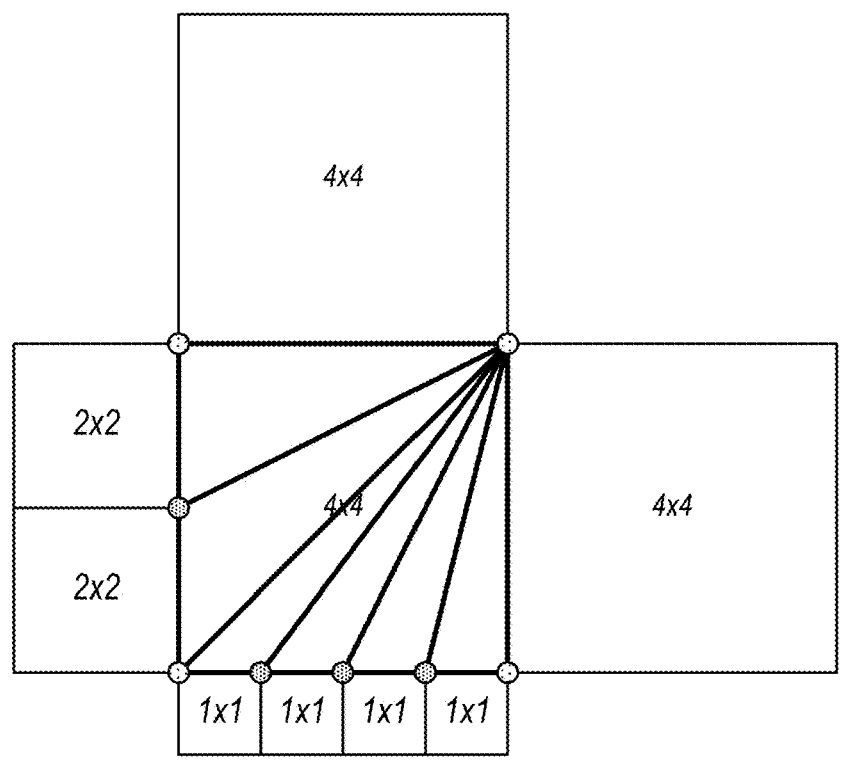
FIGS. 11A and 11B illustrate examples of re-meshing that may be performed to increase a triangle count in particular regions of a sub-mesh corresponding to a given block (or sub-block), according to some embodiments.
Figure 11B:
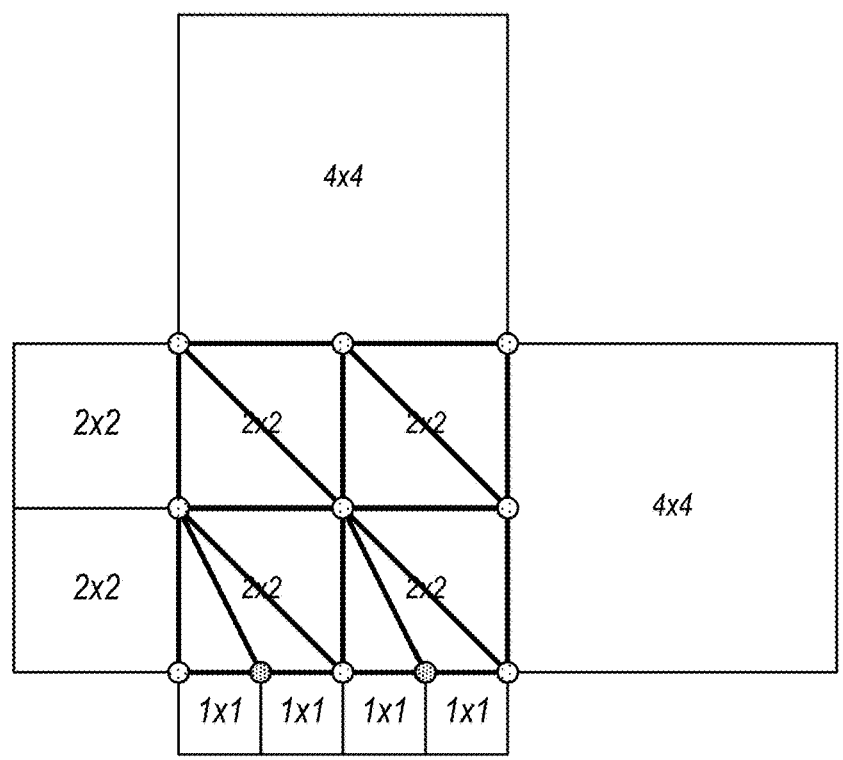

FIGS. 11A and 11B illustrate examples of re-meshing that may be performed to increase a triangle count in particular regions of a sub-mesh corresponding to a given block (or sub-block), according to some embodiments.

In some embodiments, an additional re-meshing procedure may be performed on the simplified mesh comprising the merged sub-meshes. In some embodiments, such a re-meshing may be performed as follows:

During a first pass, information about the retained subdivision structure for each (M+1)×(N+1) block (e.g., 4×4 block or four 2×2 blocks, or three 2×2 blocks and four 1×1 blocks . . . ) is determined.

During a second pass, each block is triangulated based on its neighboring blocks (or sub-blocks), while making sure that all boundary points introduced by the neighboring blocks are taken into account. FIG. 11A-11B shows examples of how this could be achieved for two possible configurations.

In the second pass, multiple triangulations are possible. Choosing the best triangulation may consider different criteria such as: shape of the generated triangles; number of generated triangles; decimation error, etc.

Also, in some embodiments, different strategies for the re-meshing may be used based on the available time budget, such as finding the best triangulation based on the above criteria with different weightings assigned to the different criteria, e.g. shape of the generated triangles; number of generated triangles; decimation error, etc. Another strategy that may be used is a fixed choice per configuration or heuristics to achieve the best possible results (according the criteria defined above) for a fixed time budget.

In some embodiments, a decimation error threshold ε could be adaptively set for different regions based on various criteria (e.g., position with respect to the camera, confidence, importance, etc.)

In some embodiments, given a triangle budget, the decimation error threshold ε could be adaptively updated in order to achieve a number of triangles lower or equal to the budget. Prediction techniques from previous frames and intra frame prediction could be used to help with this process. The techniques used for rate control in video coding could be transposed.

In some embodiments, generation of interpolated values could be obtained by leveraging hardware-accelerated mipmap generation. Otherwise, it could highly benefit from single instruction multiple data (SIMD) operations.

In some embodiments, the decimation technique could consider directly depth values, or any quantity related to depth such as disparity, inverse of depth, or any function of depth.

Figure 12:
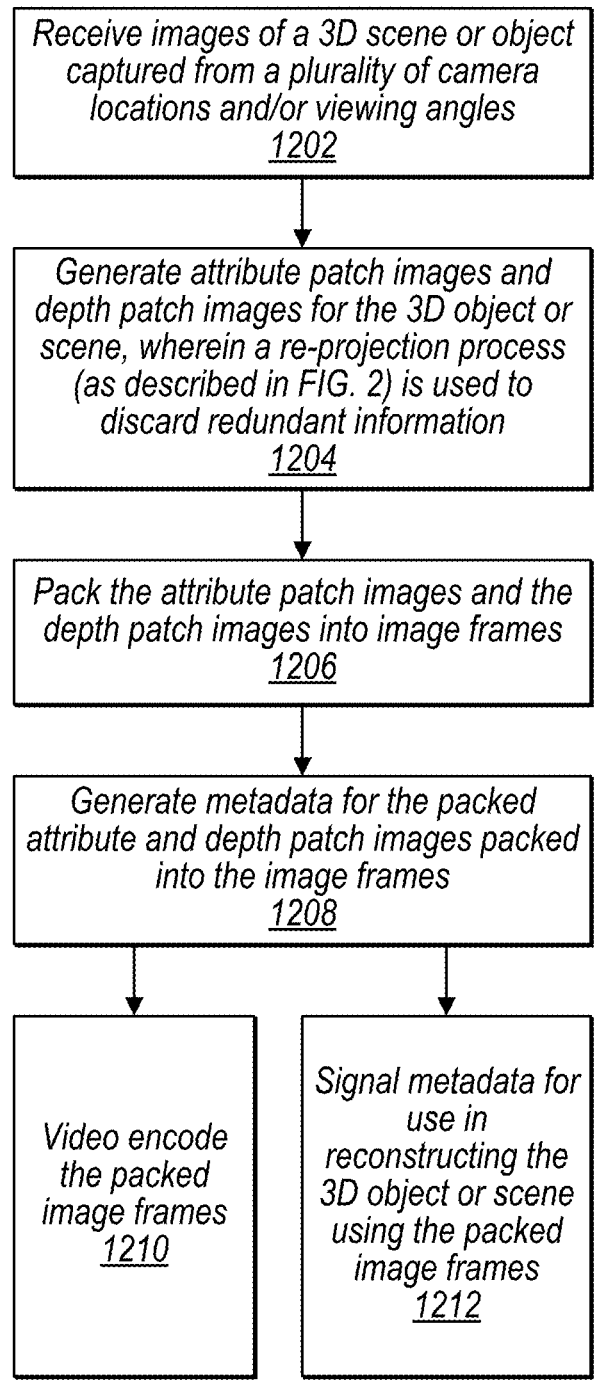
FIG. 12 illustrates a flowchart for encoding three-dimensional (3D) volumetric content using video encoded 2D image frames, according to some embodiments.

FIG. 12 illustrates a flowchart for encoding three-dimensional (3D) volumetric content using video encoded 2D image frames, according to some embodiments.

At 1202, an encoding computing device (such as the encoder shown in FIG. 4, e.g. an "encoder") receives images of a 3D scene or object captured from a plurality of camera locations and/or viewing angles, such as the views shown in FIGS. 1D captured by the cameras shown in FIGS. 1A-1C. At 1204, the encoder generates attribute patch images and depth patch images for the 3D object or scene, wherein a re-projection process (as described in FIG. 2) is used to discard redundant information. At 1206 the encoder packs the attribute patch images and the depth patch images (e.g. the atlas and depth map) into 2D image frames, such as frames of a video image that are to be video encoded. At 1208, the encoder generates metadata for the packed attribute and depth patch images packed into the image frames, such as auxiliary information indicating bounding box sizes and locations for bounding boxes for the respective patches (e.g. attribute patch images and corresponding depth patch images/depth maps). At 1210, the encoder video encodes the packed image frames and, at 1212, the encoder signals the metadata. For example the video encoded image frames and entropy encoded metadata may be included in an encoded bit stream for the 3D volumetric content.

Figure 13A:
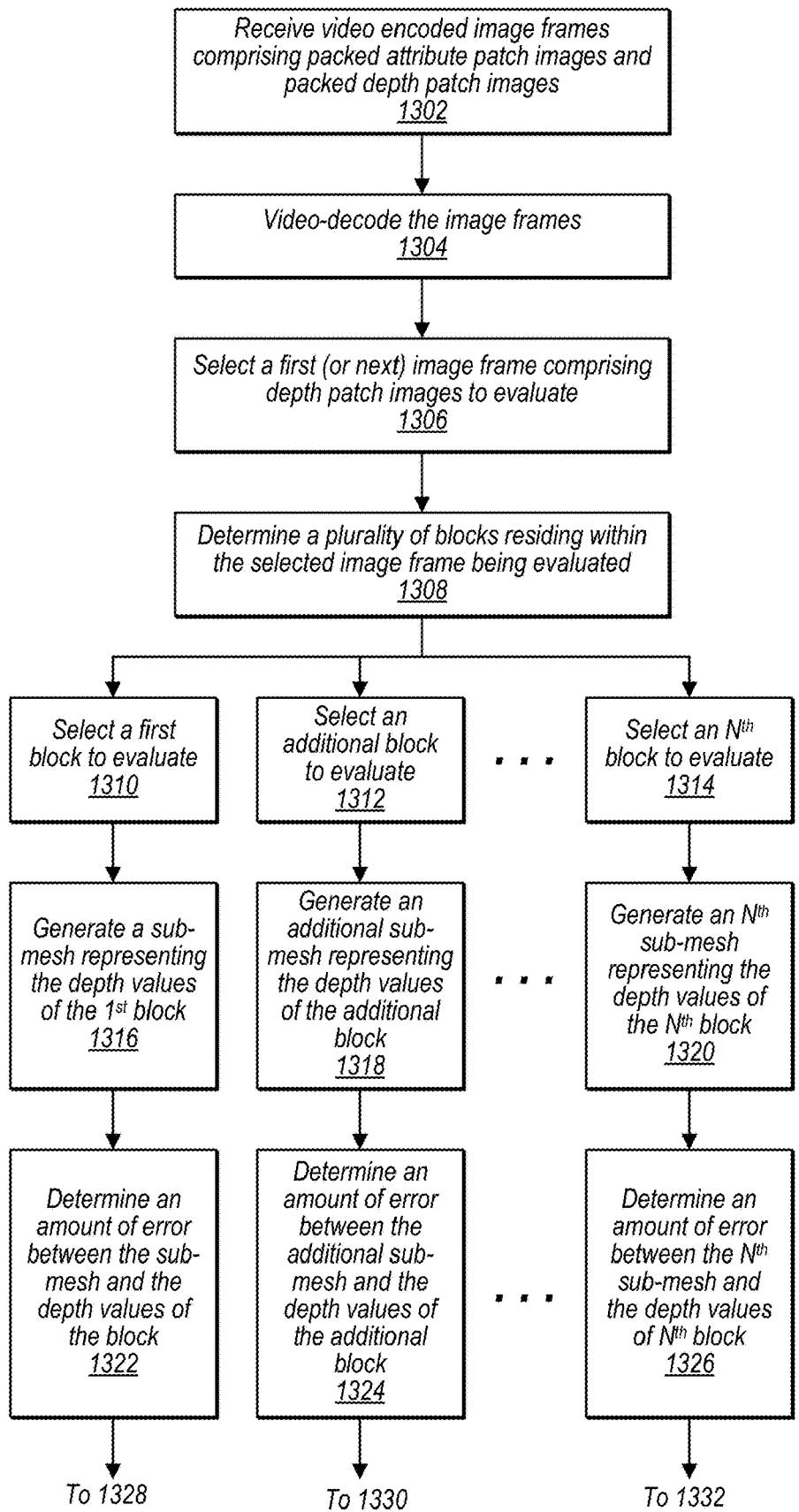
FIG. 13A illustrates a flowchart for determining blocks for portions of a packed image frame comprising depth patch images and determining error amounts for the blocks if a corresponding sub-mesh is generated for the blocks without further subdividing the respective blocks, according to some embodiments.
Figure 13B:
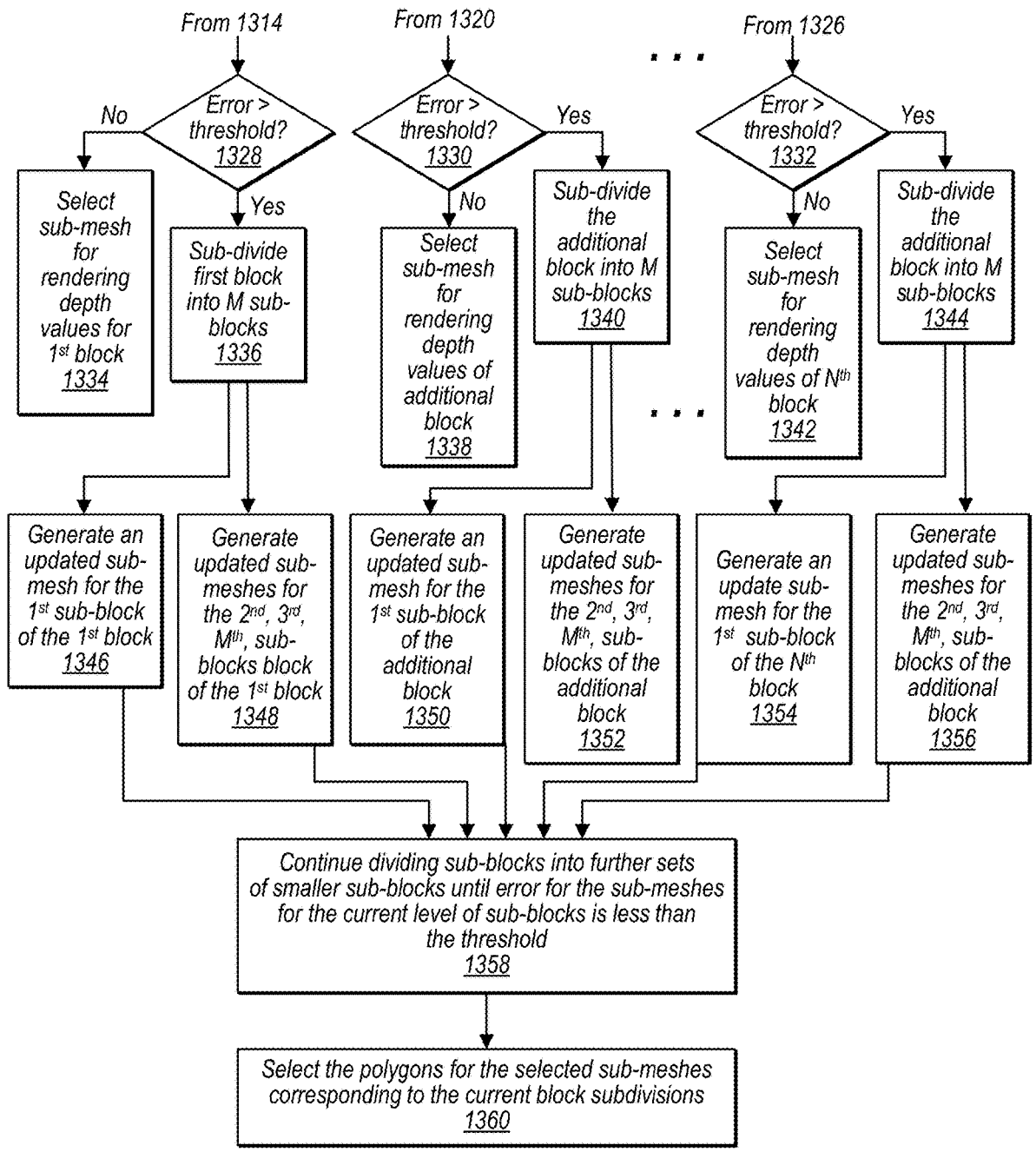
FIG. 13B is a continuation of the flowchart from FIG. 13A and illustrates the blocks being further subdivided if the determined error exceeds an error threshold, wherein the blocks and sub-blocks are iteratively sub-divided until the error threshold is met, according to some embodiments.

FIGS. 13A-13B illustrate a flowchart for determining blocks for portions of a packed image frame comprising depth patch images and determining error amounts for the blocks if a corresponding sub-mesh is generated for the blocks without further subdividing the respective blocks. The flowchart further illustrates the blocks being further subdivided if the determined error exceeds an error threshold, wherein the blocks and sub-blocks are iteratively subdivided until the error threshold is met, according to some embodiments.

At 1302 a decoding computing device (e.g. decoder) receives video encoded image frames comprising packed attribute patch images and packed depth patch images (e.g. depth maps). At 1304, the decoder video decodes the video-encoded image frames and at 1306 selects a first (or next) image frame comprising depth patch images to evaluate.

At 1308, the decoder determines a plurality of blocks residing within the selected image frame being evaluated, such as the blocks shown in FIGS. 7A-7D. The blocks may be evaluated in parallel by the decoder. Thus at 1310, 1312, and 1314 the decoder selects blocks of the selected image frame to evaluate. At 1316, 1318, and 1320 the decoder generates a sub-mesh for each of the respective blocks, such as the sub-mesh illustrated in FIGS. 8A and 8B. At 1322, 1324, and 1326 the decoder determines an error amount between approximated depth values that approximate a surface of the sub-mesh and actual depth values signaled for the block in the depth map. For example, as shown in FIG. 8B. At 1328, 1330, and 1332 the decoder determines if the error amounts are greater than an error threshold. If so, then the blocks are further sub-divided at 1336, 1338, or 1342 (note that each block is evaluated separately so that some blocks may be sub-divided while others are not further sub-divided). For example, the blocks may be subdivided as shown in FIGS. 9A-9C. If the determined error is less than the threshold, then the sub-mesh corresponding to the block(s) (without further sub-division) is selected for use in rendering the 3D volumetric content, e.g. this done at 1334, 1338, and/or 1342. For the blocks that were further sub-divided an updated sub-mesh is generated for each sub-block of the further subdivided block, this is done at 1346, 1348, 1350, 1352, 1354, and 1356. Error values are determined for the further subdivided blocks and the process is repeated (at 1358) until error for the sub-meshes for the current level of sub-blocks is less than the threshold. At 1360 the polygons to be used to render the 3D volumetric content are selected based on the sub-division process taking into account acceptable error.

Figure 14:
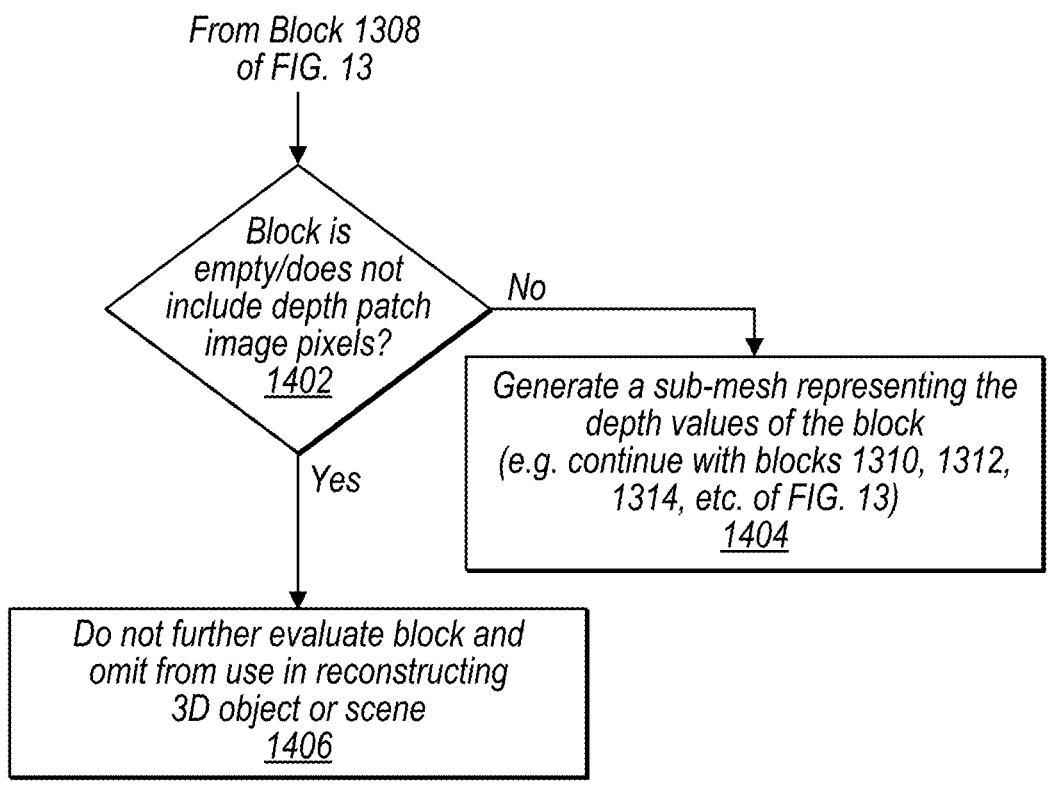
FIG. 14 illustrates a flowchart for steps that may be included in the process shown in FIGS. 13A/13B to exclude empty blocks from further consideration, according to some embodiments.

FIG. 14 illustrates a flowchart for steps that may be included in the process shown in FIGS. 13A/13B to exclude empty blocks from further consideration, according to some embodiments.

In some embodiments, blocks that do not include any occupied pixels (e.g. depth values) may be omitted from further consideration. For example, prior to evaluating a given block at 1310, 1312, or 1314, the process shown in FIG. 14 may be performed, wherein at 1402 it is determined whether or not the block is empty. If the block is not empty, the process proceeds to 1310, 1312, or 1314 (as shown in 1404 of FIG. 14). If the block is empty, the block is omitted from further evaluation (1406 of FIG. 14).

Example Inertial Measurement Unit (IMU)

FIG. 15 illustrates an example inertial measurement unit (IMU) that may be included in a decoding device, according to some embodiments.

Inertial measurement device 1500 includes accelerometer 1502 aligned with a Z-axis and configured to measure acceleration in the Z-direction, accelerometer 1504 aligned with a X-axis and configured to measure acceleration in the X-direction, and accelerometer 1506 aligned with a Y-axis and configured to measure acceleration in the Y-direction. Inertial measurement device 1500 also includes gyroscope 1508 configured to measure angular motion (Y) about the Z-axis, gyroscope 1510 configured to measure angular motion (0) about the X-axis, and gyroscope 1512 configured to measure angular motion (Q) about the Y-axis. In some embodiments, an inertial measurement device, such as inertial measurement device 1500 may include additional sensors such as magnetometers, pressure sensors, temperature sensors, etc. The accelerometers and gyroscopes of an inertial measurement device, such as accelerometers 1502, 1504, and 1506, and gyroscopes 1508, 1510, and 1512, may measure both translation motion and angular motion in multiple directions and about multiple axis. Such measurements may be used by one or more processors to determine motion of an object mechanically coupled to an inertial measurement device in three-dimensional space, such as decoding computing device.

Example Computer System

Figure 16:
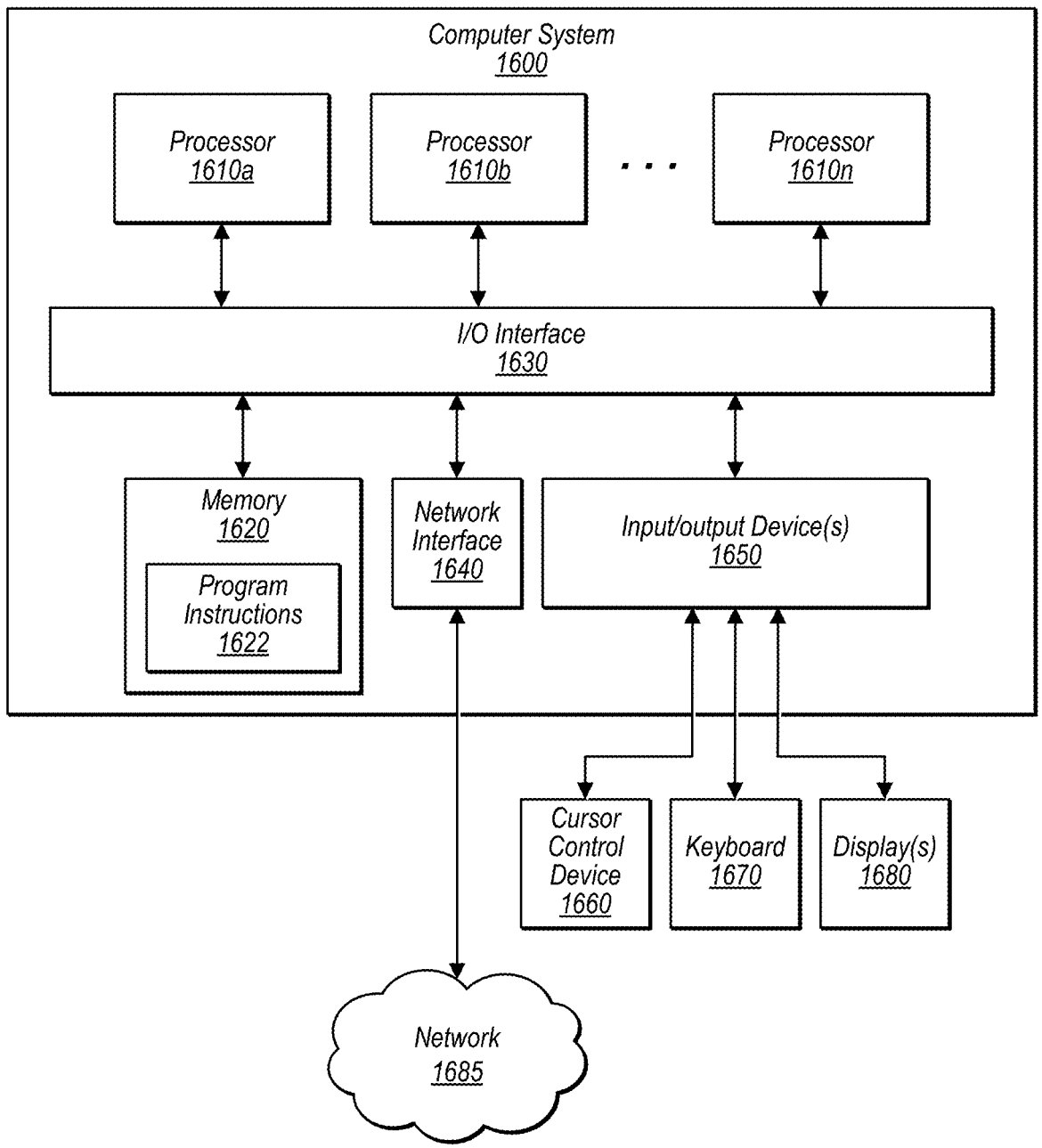
FIG. 16 illustrates an example computer system that may implement an encoder or decoder, according to some embodiments.

FIG. 16 illustrates an example computer system 1600 that may implement an encoder or decoder or any other ones of the components described herein, (e.g., any of the components described above with reference to FIGS. 1-15), in accordance with some embodiments. The computer system 1600 may be configured to execute any or all of the embodiments described above. In different embodiments, computer system 1600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of an encoder or decoder, as described herein may be executed in one or more computer systems 1600, which may interact with various other devices. Note that any component, action, or functionality described above with respect to FIGS. 1-15 may be implemented on one or more computers configured as computer system 1600 of FIG. 16, according to various embodiments. In the illustrated embodiment, computer system 1600 includes one or more processors 1610 coupled to a system memory 1620 via an input/output (I/O) interface 1630. Computer system 1600 further includes a network interface 1640 coupled to I/O interface 1630, and one or more input/output devices 1650, such as cursor control device 1660, keyboard 1670, and display(s) 1680. In some cases, it is contemplated that embodiments may be implemented using a single instance of computer system 1600, while in other embodiments multiple such systems, or multiple nodes making up computer system 1600, may be configured to host different portions or instances of embodiments. For example, in one embodiment some elements may be implemented via one or more nodes of computer system 1600 that are distinct from those nodes implementing other elements.

In various embodiments, computer system 1600 may be a uniprocessor system including one processor 1610, or a multiprocessor system including several processors 1610 (e.g., two, four, eight, or another suitable number). Processors 1610 may be any suitable processor capable of executing instructions. For example, in various embodiments processors 1610 may be general-purpose or embedded processors implementing any of a variety of instruction set architectures (ISAs), such as the x86, PowerPC, SPARC, or MIPS ISAs, or any other suitable ISA. In multiprocessor systems, each of processors 1610 may commonly, but not necessarily, implement the same ISA.

System memory 1620 may be configured to store compression or decompression program instructions 1622 and/or sensor data accessible by processor 1610. In various embodiments, system memory 1620 may be implemented using any suitable memory technology, such as static random access memory (SRAM), synchronous dynamic RAM (SDRAM), nonvolatile/Flash-type memory, or any other type of memory. In the illustrated embodiment, program instructions 1622 may be configured to implement an image sensor control application incorporating any of the functionality described above. In some embodiments, program instructions and/or data may be received, sent or stored upon different types of computer-accessible media or on similar media separate from system memory 1620 or computer system 1600. While computer system 1600 is described as implementing the functionality of functional blocks of previous Figures, any of the functionality described herein may be implemented via such a computer system.

In one embodiment, I/O interface 1630 may be configured to coordinate I/O traffic between processor 1610, system memory 1620, and any peripheral devices in the device, including network interface 1640 or other peripheral interfaces, such as input/output devices 1650. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices attached to a network 1685 (e.g., carrier or agent devices) or between nodes of computer system 1600. Network 1685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1650 may, in some embodiments, include one or more display terminals, keyboards, keypads, touchpads, scanning devices, voice or optical recognition devices, or any other devices suitable for entering or accessing data by one or more computer systems 1600. Multiple input/output devices 1650 may be present in computer system 1600 or may be distributed on various nodes of computer system 1600. In some embodiments, similar input/output devices may be separate from computer system 1600 and may interact with one or more nodes of computer system 1600 through a wired or wireless connection, such as over network interface 1640.

As shown in FIG. 16, memory 1620 may include program instructions 1622, which may be processor-executable to implement any element or action described above. In one embodiment, the program instructions may implement the methods described above. In other embodiments, different elements and data may be included. Note that data may include any data or information described above.

Those skilled in the art will appreciate that computer system 1600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1600 may be transmitted to computer system 1600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A non-transitory, computer-readable, medium storing program instructions, that when executed on or across one or more processors, cause the one or more processors to:
   receive image frames, wherein respective ones of the image frames comprise depth patch images for a three-dimensional (3D) object or scene; and
   for respective ones of the image frames comprising depth patch images:
   determine a plurality of blocks residing within the respective image frame comprising depth patch images, and
   for respective ones of the blocks:
   generate a sub-mesh having a first mesh resolution, wherein the sub-mesh comprises connected vertices, and wherein the sub-mesh corresponds to a sub-portion of the 3D object or scene represented by the respective block;
   determine an amount of error for the sub-mesh as compared to spatial information indicated by a sub-set of pixels of the respective image frame that correspond with the respective block;
   determine if the amount of error is less than an error threshold, and
   select the generated sub-mesh having the first mesh resolution for use in reconstruction of the 3D object or scene if the determined amount of error is less than the error threshold; or
   iteratively sub-divide the block into sub-blocks each having a corresponding sub-mesh and determine respective amounts of error for the sub-meshes associated with the iteratively sub-divided blocks, wherein each sub-block is further divided in a subsequent iteration if its corresponding error amount in a current iteration is greater than the error threshold.

2. The non-transitory, computer-readable medium of claim 1, wherein the program instructions, when executed on or across the one or more processors, cause the one or more processors to:
  determine the plurality of blocks such that each block comprises a sub-set of pixels of the respective image frame, and wherein edge pixels of the blocks overlap with one or more adjacent blocks such that a set of edge pixels belonging to a given block also belong to an adjacent block, adjacent to the given block.

3. The non-transitory, computer-readable, medium of claim 1, wherein the sub-mesh having the first mesh resolution comprises two polygons, and wherein to generate an updated sub-mesh or set of sub-meshes, the program instructions, when executed on or across the one or more processors, cause the one or more processors to:
  divide the block into a set of two or more sub-blocks; and
  generate two polygons per respective sub-block for the sub-blocks resulting from the division of the block,
  wherein the updated sub-mesh or set of sub-meshes having the other mesh resolution comprises the two polygons per sub-block for the sub-blocks resulting from division of the block.

4. The non-transitory, computer-readable, medium of claim 3, wherein to determine the amount of error for the sub-mesh, or the updated sub-mesh or set of sub-meshes, as compared to spatial information indicated by the sub-set of pixels of the respective image frame that correspond with the block, the program instructions, when executed on or across the one or more processors, cause the one or more processors to:
  generate depth values representing depths of surfaces of the polygons using interpolation based on depth values signaled in the image frame for corner pixels of the block.

5. The non-transitory, computer-readable, medium of claim 4, wherein for generated depth values representing depths of surfaces of the polygons that fall on block boundaries between adjacent blocks, depth values generated for a larger block are not overwritten by depth values generated for a smaller block that shares boundary pixels with the larger block.

6. The non-transitory, computer-readable, medium of claim 4, wherein for generated depth values representing depths of surfaces of the polygons that fall on block boundaries between adjacent blocks, depth values for the boundary are generated only based on a set of two corner pixels of the block on either side of a given block boundary for which the depth values for the boundary are being generated.

7. The non-transitory, computer-readable, medium of claim 4, wherein a same interpolation procedure is used to determine the amount of error or the other amount of error as is used to render the sub-mesh or the updated sub-mesh or set of sub-meshes in the reconstruction of the 3D object or scene.

8. The non-transitory, computer-readable medium of claim 1, wherein pixels of the depth patch images indicate inverse depths values and
  wherein the program instructions, when executed on or across the one or more processors, cause the one or more processors to:
  convert the inverse depth values into depth values for use in generating the sub-mesh, or an updated sub-mesh or set of sub-meshes.

9. The non-transitory, computer-readable, medium of claim 1, wherein the program instructions, when executed on or across the one or more processors, further cause the one or more processors to:
  using the selected sub-mesh having the first mesh resolution or an updated sub-mesh or set of sub-meshes having other mesh resolution,
  generate updated polygons for the selected sub-mesh or the updated sub-mesh or set of sub-meshes, wherein the updated polygons for a given block or sub-block are determined based on neighboring blocks or sub-blocks that border the respective block for which the polygons are being updated, wherein the updated polygons take into account depth values determined for polygons of the neighboring blocks or sub-blocks.

10. The non-transitory, computer-readable, medium of claim 1, wherein the program instruction, when executed on or across the one or more processors, further cause the one or more processors to:
  identify whether a given block to be evaluated does not comprise pixels representing a depth patch image, and if so, proceed to a next block without further evaluating the given block.

11. The non-transitory, computer-readable, medium of claim 1, wherein the program instructions cause the one or more processors to:
  evaluate two or more of the respective blocks residing within the respective image frame in parallel.

12. The non-transitory, computer-readable, medium of claim 1, wherein the error threshold is adaptively determined based on a viewport view from which the 3D object or scene is being viewed.

13. The non-transitory, computer-readable, medium of claim 1, wherein the error threshold is adaptively determined differently for different blocks or sub-blocks based on received metadata for the 3D object or scene to be reconstructed.

14. The non-transitory, computer-readable, medium of claim 1, wherein the error threshold is adaptively determined based on a resource budget determined for rendering the 3D object or scene or a part thereof.

15. A device, comprising:
  a memory storing program instructions; and
  one or more processors, wherein the program instructions, when executed on the one or more processors, cause the one or more processors to:
    receive image frames, wherein respective ones of the image frames comprise depth patch images for a three-dimensional (3D) object or scene; and
    for respective ones of the image frames comprising depth patch images:
      determine a plurality of blocks residing within the respective image frame comprising depth patch images, and
      for respective ones of the blocks:
        generate a sub-mesh having a first mesh resolution, wherein the sub-mesh comprises connected vertices, and wherein the sub-mesh corresponds to a sub-portion of the 3D object or scene represented by the respective block;
        determine an amount of error for the sub-mesh as compared to spatial information indicated by a sub-set of pixels of the respective image frame that correspond with the respective block;
        determine if the amount of error is less than an error threshold, and select the generated sub-mesh having the first mesh resolution for use in reconstruction of the 3D object or scene if the determined amount of error is less than the error threshold; or iteratively sub-divide the block into sub-blocks each having a corresponding sub-mesh and determine respective amounts of error for the sub-meshes associated with the iteratively sub-divided blocks, wherein each sub-block is further divided in a subsequent iteration if its corresponding error amount in a current iteration is greater than the error threshold.

16. The device of claim 15, further comprising:

a display, wherein the program instructions, when executed on or across the one or more processors, further cause the one or more processors to:

render the 3D object or scene on the display of the device using the selected sub-mesh or an updated sub-mesh or set of sub-meshes.

17. The device of claim 16, further comprising:

an inertial measurement unit, wherein the program instructions, when executed on or across the one or more processors, further cause the one or more processors to:

determine a viewport view from which the 3D object or scene is to be viewed in the display based on measurements from the inertial measurement unit; and adaptively determine the error threshold to be applied for respective ones of the blocks or respective sets of the blocks based on the viewport view from which the 3D object or scene is to be viewed in the display.

18. The device of claim 15, wherein the program instructions, when executed on or across the one or more processors, cause the one or more processors to:

determine the plurality of blocks such that each block comprises a sub-set of pixels of the respective image frame, and wherein edge pixels of the blocks overlap with one or more adjacent blocks such that a set of edge pixels belonging to a given block also belong to an adjacent block, adjacent to the given block.

19. The device of claim 15, wherein to generate an updated sub-mesh or set of sub-meshes, the program instructions, when executed on or across the one or more processors, cause the one or more processors to:

divide the block into a set of two or more sub-blocks; and generate more polygons for the sub-blocks resulting from the division of the block than were included in the sub-mesh having the first mesh resolution.

20. A method of reconstructing a representation of a 3D object or scene, the method comprising:

determining a plurality of blocks residing within an image frame comprising depth patch images, and for respective ones of the blocks:

generating a sub-mesh having a first mesh resolution, wherein the sub-mesh comprises connected vertices, and wherein the sub-mesh corresponds to a sub-portion of the 3D object or scene represented by the respective block;

determining an amount of error for the sub-mesh as compared to spatial information indicated by a sub-set of pixels of the respective image frame that correspond with the respective block;

determining if the amount of error is less than an error threshold, and selecting the generated sub-mesh having the first mesh resolution for use in reconstruction of the 3D object or scene if the determined amount of error is less than the error threshold; or iteratively sub-dividing the block into sub-blocks each having a corresponding sub-mesh and determine respective amounts of error for the sub-meshes associated with the iteratively sub-divided blocks, wherein each sub-block is further divided in a subsequent iteration if its corresponding error amount in a current iteration is greater than the error threshold.

* * * * *